United States Patent
Johnson et al.

(10) Patent No.: US 9,906,357 B2
(45) Date of Patent: Feb. 27, 2018

(54) OFDM FRAME SYNCHRONIZATION FOR COHERENT AND DIRECT DETECTION IN AN OPTICAL FIBER TELECOMMUNICATION SYSTEM

(71) Applicant: The Arizona Board of Regents on Behalf of the University of Arizona, Tucson, AZ (US)

(72) Inventors: Stanley Johnson, Tucson, AZ (US); Milorad Cvijetic, Tucson, AZ (US)

(73) Assignee: THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 15/369,211

(22) Filed: Dec. 5, 2016

(65) Prior Publication Data

US 2017/0163406 A1 Jun. 8, 2017

Related U.S. Application Data

(60) Provisional application No. 62/263,115, filed on Dec. 5, 2015.

(51) Int. Cl.
*H04L 27/28* (2006.01)
*H04B 10/00* (2013.01)
(Continued)

(52) U.S. Cl.
CPC ......... *H04L 7/0075* (2013.01); *H04B 10/613* (2013.01); *H04B 10/6161* (2013.01); *H04L 5/0007* (2013.01)

(58) Field of Classification Search
CPC ...... H04J 3/00; H04J 14/02; H04J 3/06; H04J 3/0614; H04N 5/10; H04N 5/04; H04L 5/0007
(Continued)

(56) References Cited

U.S. PATENT DOCUMENTS

2002/0018259 A1* 2/2002 Hait ..................... H04J 14/02
398/43
2008/0247454 A1* 10/2008 Movshovich .......... G09G 5/006
375/240.01

(Continued)

*Primary Examiner* — Don N Vo
(74) *Attorney, Agent, or Firm* — Mayer & Williams PC; Stuart H. Mayer

(57) ABSTRACT

An optical receiver includes a detector and frame synchronizer. The detector receives an optical OFDM bit stream having a plurality of frames. Each frame has an in-phase and quadrature phase component. Each component has an OFDM symbol-bearing data payload and a synchronization header. The synchronization header includes a single synchronization pulse. The frame synchronizer detects the synchronization header on each phase component. The frame synchronizer includes first and second pairs of digital comparators for each of the in-phase and quadrature phase components. The first and second pairs of digital comparators associated with each phase component establishes different and adjustable threshold windows that is symmetric about a zero amplitude of the synchronization pulse of the respective phase component. Each frame is synchronized when the synchronization pulse respectively associated therewith is detected as having an amplitude extending beyond at least one of the windows established for one of the phase components.

15 Claims, 30 Drawing Sheets

(51) Int. Cl.
*H04L 7/00* (2006.01)
*H04B 10/61* (2013.01)
*H04L 5/00* (2006.01)

(58) Field of Classification Search
USPC .......................................... 398/208; 375/260
See application file for complete search history.

(56) References Cited

U.S. PATENT DOCUMENTS

| 2010/0118192 A1* | 5/2010 | Zakriti | ..................... | H04N 5/05 |
| | | | | 348/501 |
| 2014/0022546 A1* | 1/2014 | Nagai | ..................... | G01J 3/021 |
| | | | | 356/326 |

\* cited by examiner

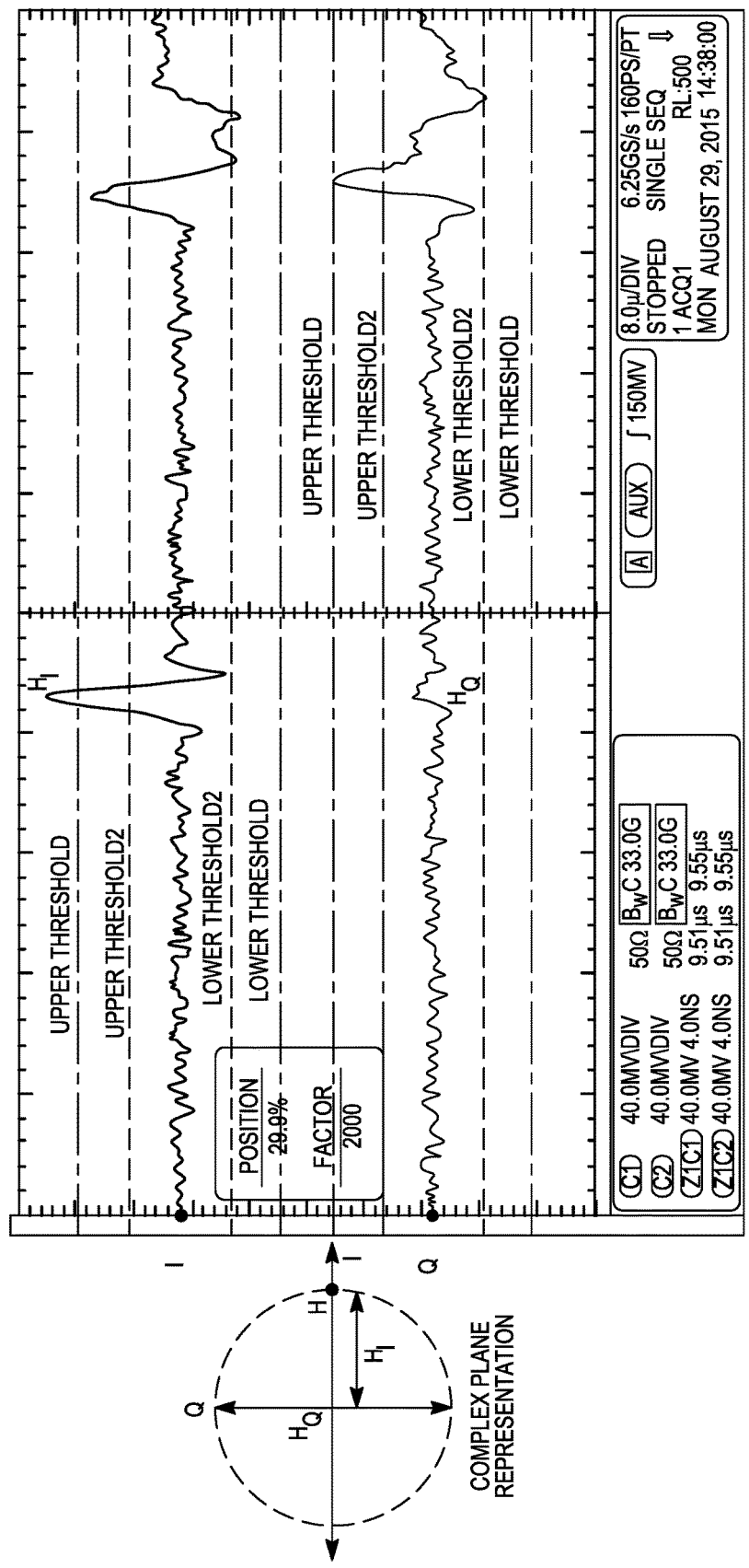

TIME DOMAIN REPRESENTATION

THE HEADER SAMPLED AT ONE OF 8 REPRESENTATIVE PHASE POSITIONS. THE HORIZONTAL SCALE IS 4 NS/DIV.

THE LATCH BLOCK IN EACH OF THE 8 POSSIBLE LATCH_STATE CONDITIONS.

THE TIMING DIAGRAM OF THE HEADER_SYNCH BLOCK

THE TIMING DIAGRAM OF THE HEADER_SYNCH BLOCK

THE TIMING DIAGRAM FOR THE TOP LEVEL FRAME SYNCHRONIZATION CIRCUIT

| FIG. 10 |
| FIG. 10A |
| FIG. 10B |
| FIG. 10C |
| FIG. 10D |

| BEGIN_DATA_STORAGE | | | | NO DIGITAL OFFSET | |
|---|---|---|---|---|---|
| FFT_RAM_DATA_I_LAYER3[7:0] | 0_BINARY | 0_BINARY | 0_BINARY | D1_BINARY | D9_BINARY |
| FFT_RAM_DATA_I_LAYER3[15:8] | 0_BINARY | 0_BINARY | 0_BINARY | D2_BINARY | D10_BINARY |
| FFT_RAM_DATA_I_LAYER3[23:16] | 0_BINARY | 0_BINARY | 0_BINARY | D3_BINARY | D11_BINARY |
| FFT_RAM_DATA_I_LAYER3[31:24] | 0_BINARY | 0_BINARY | 0_BINARY | D4_BINARY | D12_BINARY |
| FFT_RAM_DATA_I_LAYER3[39:32] | 0_BINARY | 0_BINARY | 0_BINARY | D5_BINARY | D13_BINARY |
| FFT_RAM_DATA_I_LAYER3[47:40] | 0_BINARY | 0_BINARY | 0_BINARY | D6_BINARY | D14_BINARY |
| FFT_RAM_DATA_I_LAYER3[55:48] | 0_BINARY | 0_BINARY | 0_BINARY | D7_BINARY | D15_BINARY |
| FFT_RAM_DATA_I_LAYER3[63:56] | 0_BINARY | 0_BINARY | 0_BINARY | D8_BINARY | D16_BINARY |

| FIG. 10 |
|---|
| FIG. 10A |
| FIG. 10B |
| FIG. 10C |
| FIG. 10D |

*FIG. 10B*

THE TIMING DIAGRAM FOR THE TOP LEVEL FRAME SYNCHRONIZATION CIRCUIT

THE TIMING DIAGRAM FOR THE TOP LEVEL FRAME SYNCHRONIZATION CIRCUIT

| FIG. 10 |
|---|
| FIG. 10A |
| FIG. 10B |
| FIG. 10C |
| FIG. 10D |

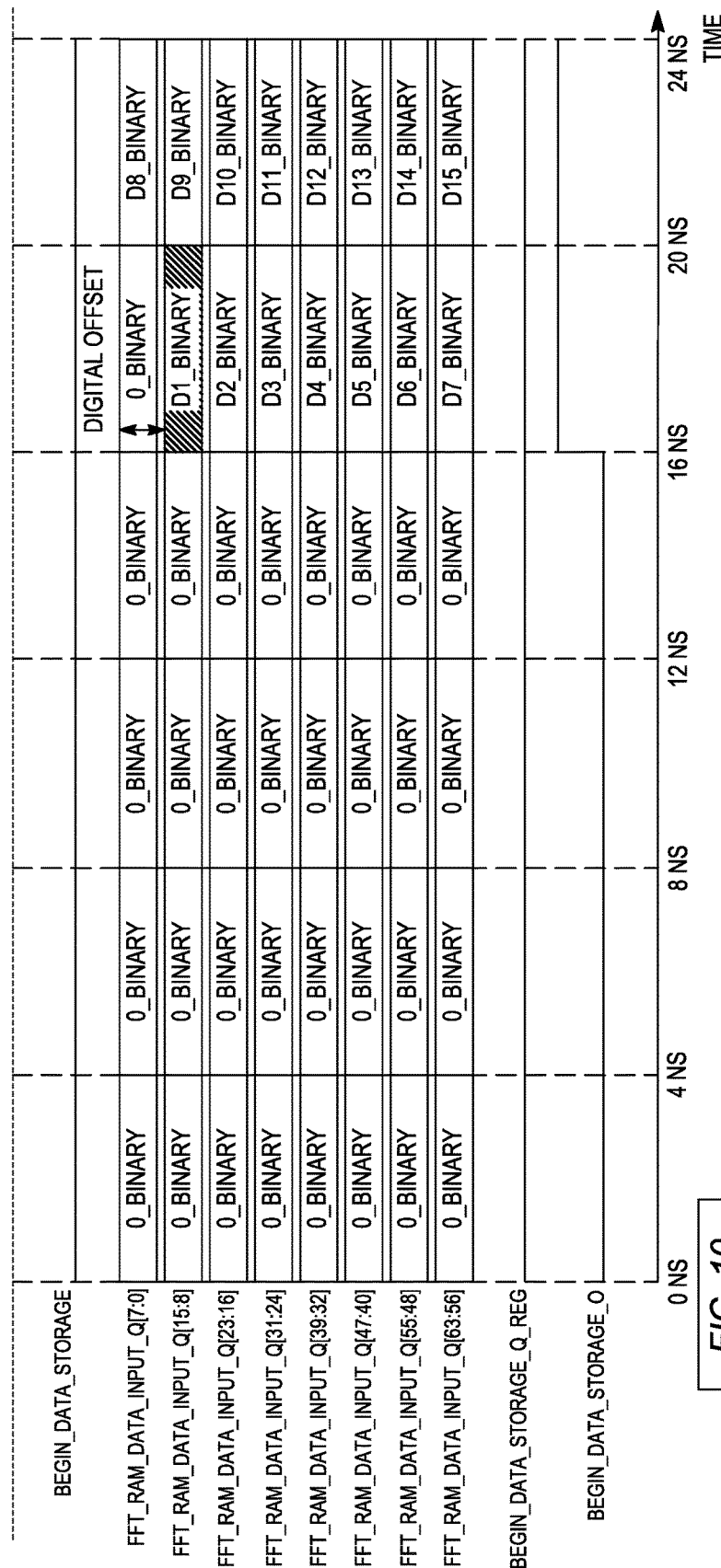

OFDM FRAME SYNCHRONIZATION FOR COHERENT AND DIRECT DETECTION IN AN OPTICAL FIBER TELECOMMUNICATION SYSTEM

CROSS-REFERENCE TO RELATED APPLICATION

This application claims the benefit of U.S. Provisional Application Ser. No. 62/263,115, filed Dec. 4, 2015, entitled "OFDM FRAME SYNCHRONIZATION FOR COHERENT AND DIRECT DETECTION IN AN OPTICAL FIBER TELECOMMUNICATION SYSTEM", the contents of which are incorporated herein by reference.

GOVERNMENT FUNDING

This invention was made with government support under Grant No. EEC0812072 awarded by NSF. The government has certain rights in the invention.

BACKGROUND

Orthogonal frequency division multiplexing (OFDM) is a promising candidate for next generation elastic optical networks due to its inherent ability to support multiple users, its capability to adapt to channel frequency response and its dispersion tolerance. One of the important operations of OFDM reception is frame synchronization.

FIGS. 2A and 2B depict the problem OFDM reception faces. OFDM relies on modulating a large number of low bandwidth subcarriers (SCs) with data using an Inverse Fast Fourier Transform (IFFT) operation at the transmitter. The receiver uses the Fast Fourier Transform (FFT) operation to demodulate the data. OFDM data is transmitted as a series of IFFT frames—each IFFT frame consisting of data from one IFFT operation. FIGS. 2A and 2B show a sequence of IFFT frames that arrive at a receiver. Each frame includes symbols 1-N. At the receiver, it is necessary that only the data from one IFFT frame be used as input to the corresponding FFT operation. This ideal situation is shown in FIG. 2A. Practically however, there is a random temporal offset between the received IFFT frames and their expected position. This offset is depicted in FIG. 2B. In optical fiber telecommunication systems, this random temporal offset is a result of the thermal expansion and contraction of the fiber over its entire length. This results in data from one IFFT frame being part of the computation of the FFT of the subsequent IFFT frame which causes errors in the demodulated data after FFT. Hence, frame synchronization in OFDM is an important problem.

Several methods have been proposed and demonstrated to solve the frame synchronization problem. A first group of methods is based on transmitting a predefined pattern (also called training symbols or a training sequence) and determining the temporal offset by calculating the correlation between the training symbols using iterative temporal sliding. Some particular implementations of this method require a large number of samples per training symbol (~512) and are not suitable for fiber optic OFDM communication where the requirement for Gb/s bit rates and the availability of GSa/s sampling rates do not allow for a large number of samples per symbol. Other implementations of this method rely on cross-correlating the received predefined pattern with a stored version of the predefined pattern at the receiver.

Another group of methods that have been proposed are frequency domain auto-correlation techniques. The disadvantages of this group of methods include: (a) the need for hardware multipliers to calculate correlation, this calls for more complex digital hardware; (b) iteratively calculating the temporal offset is time consuming. A maximum-likelihood (ML) based method that uses the cyclic prefix has been proposed, but this method requires hardware multipliers to calculate the ML estimate. Another method relies on transmitting the training symbols using differential-binary phase shift keying (D-BPSK) and demodulating the training symbols at the receiver using a D-BPSK demodulator and then comparing the training symbols to each other to determine the temporal offset. Here, the use of D-BPSK allows the synchronization process to be robust against the inherent random phase variations between the received signal and the carrier/local oscillator which corrupts the training symbols in the time domain. However, this also complicates the synchronization hardware due to the need for a D-BPSK demodulator. A virtual subcarrier based method also has been proposed, but this method requires hardware multipliers and is therefore more complex synchronization circuitry.

SUMMARY

In accordance with one aspect of the subject matter presented herein, an optical receiver includes a detector and a frame synchronizer. The detector is configured to receive an optical OFDM bit stream that includes a plurality of frames. Each frame has an in-phase component and a quadrature phase component. Each component of the frames has an OFDM symbol-bearing data payload and a synchronization header preceding the data payload. The synchronization header includes a single synchronization pulse. The frame synchronizer is configured to detect the synchronization header on the in-phase and the quadrature phase components. The frame synchronizer includes first and second pairs of digital comparators for each of the in-phase and quadrature phase components. The first and second pairs of digital comparators associated with the in-phase component establishes different and adjustable threshold windows that are symmetric about a zero amplitude of the synchronization pulse of the in-phase component. The first and second pairs of digital comparators associated with the quadrature phase component establish different and adjustable threshold windows that are symmetric about a zero amplitude of the synchronization pulse of the quadrature phase component. Each of the frames are synchronized when the synchronization pulse respectively associated therewith is detected as having an amplitude that extends beyond at least one of the windows established for the in-phase component or the quadrature phase component.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIGS. 5A-5H show 8 representative phase positions of the header for the frame shown in FIG. 3 in both the complex plane and the corresponding time domain for the I and Q waveforms.

FIGS. 10A-10D show timing diagrams of the top level frame synchronization module shown in FIG. 6.

DETAILED DESCRIPTION

Figure 1:
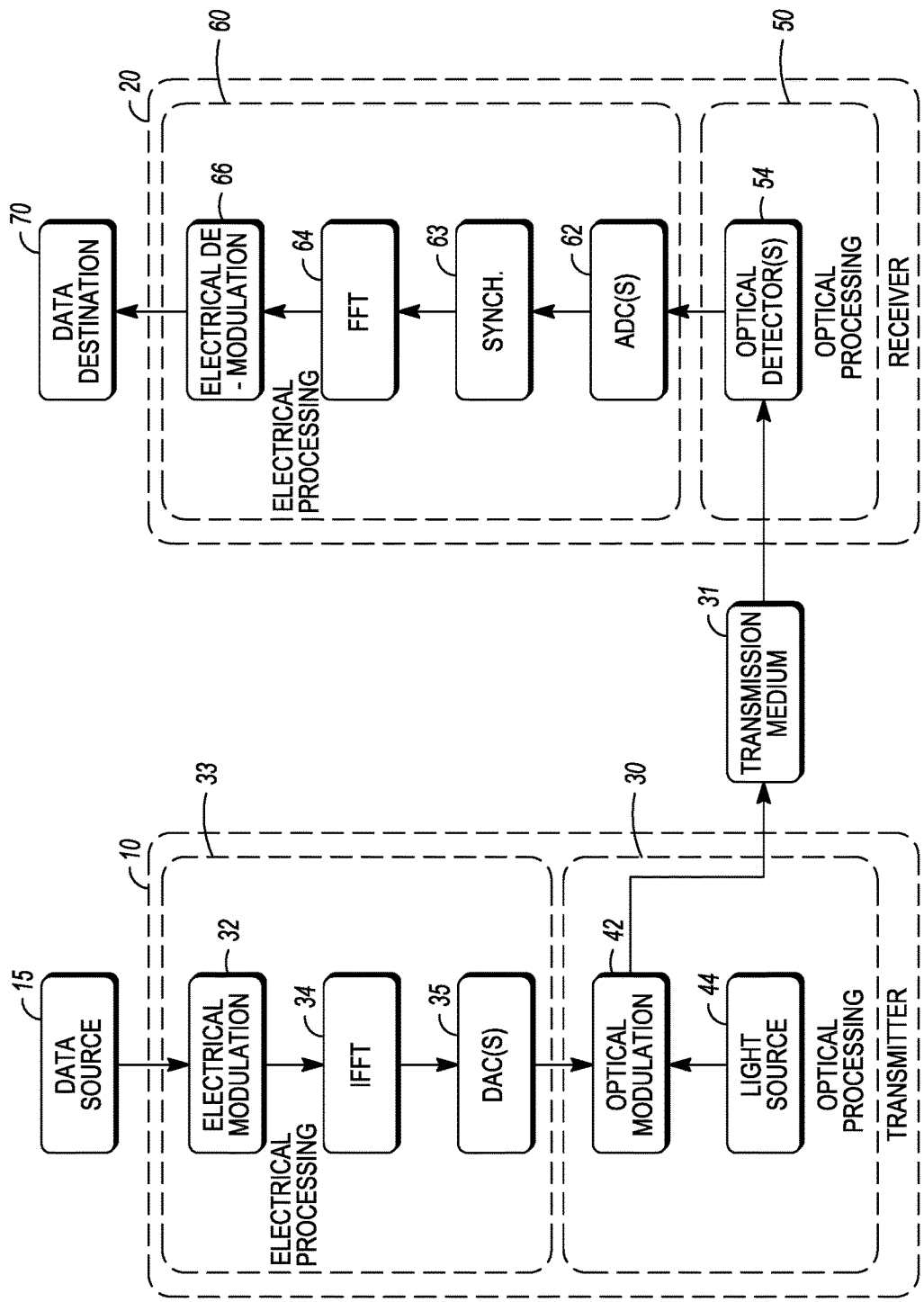
FIG. 1 shows a simplified block diagram of one example of an OFDM transmission system.
Figure 2A:
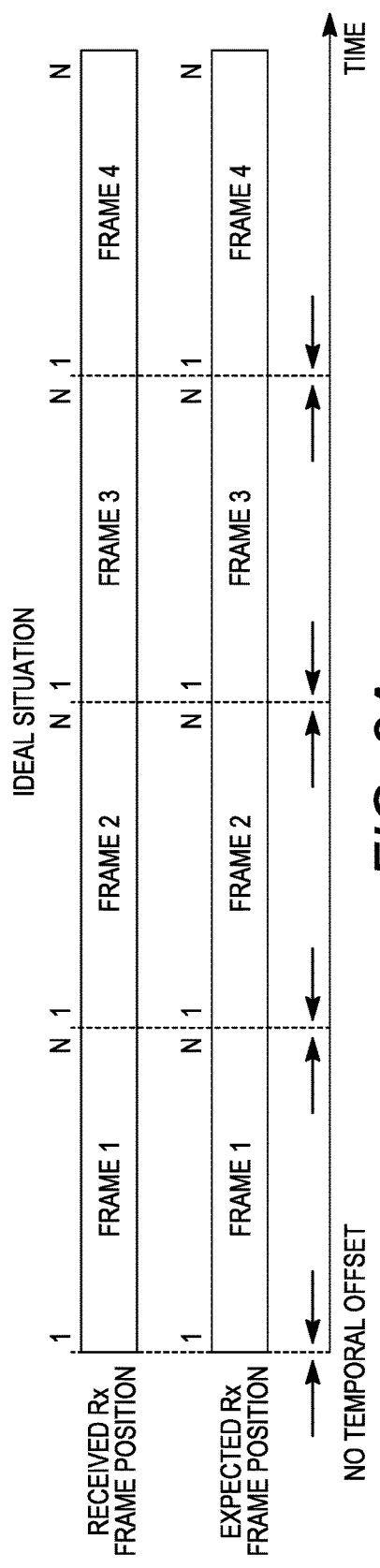
FIG. 2A shows a timing diagram illustrating the actual time (upper) a sequence of IFFT frames arrives at a receiver and the expected time (lower) the sequences of frames is to arrive at the receiver for an ideal situation.
Figure 2B:
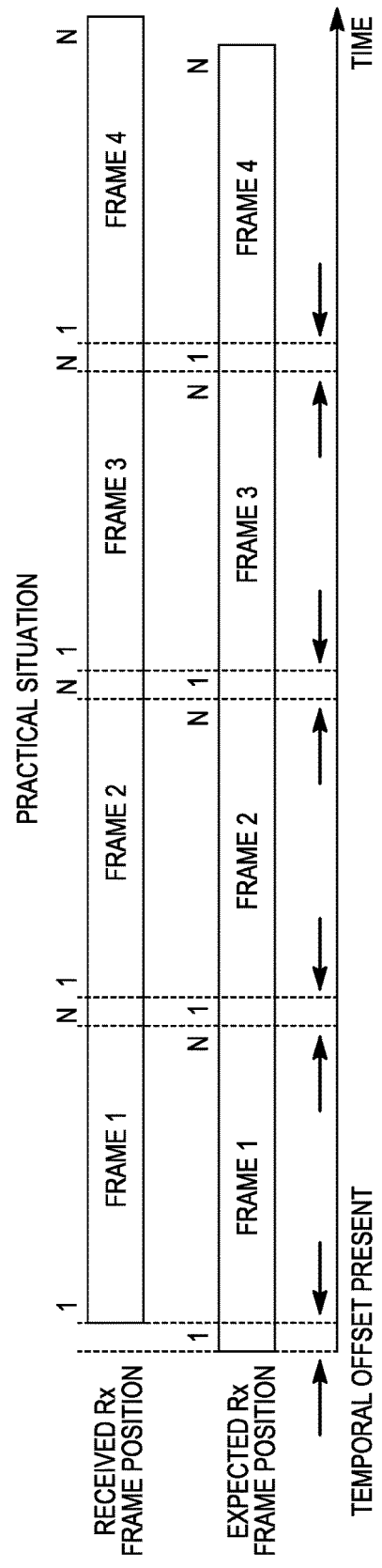
FIG. 2B shows a timing diagram illustrating the actual time (upper) a sequence of IFFT frames arrives at a receiver and the expected time (lower) the sequences of frames is to arrive at the receiver for a practical situation.

As explained below, a frame synchronization system and technique is described which in some implementations has the advantage of speed and simplicity in terms of the hardware employed. Moreover, some implementations are well-suited for self-coherent OFDM reception over optical fiber and require only 1 sample per symbol for correct operation. The method is robust against the inherent random phase variations between the received signal and the carrier/local oscillator. Some implementations require only 4 clock cycles of computation time to achieve frame synchronization. The method employs digital comparators and does not require hardware multiplication and iterative temporal sliding operations, simplifying the digital circuitry. This allows for the frame synchronization method to be implemented in a simple and cost-effective manner.

The frame synchronization technique described herein will be illustrated with reference to FIG. 1, which shows a simplified block diagram of one example of an OFDM transmission system. The OFDM transmission system of FIG. 1 includes an OFDM transmitter 10 that transmits optical OFDM signals to an OFDM receiver 20 over an optical transmission medium 31 such as optical fiber. OFDM transmitter 10 includes an electrical processing unit 33 and an optical processing unit 30. OFDM transmitter 10 receives incoming serial data from a data source 15 so that it may first be electrically processed by an electrical processing unit 33. The electrical processing unit 33 includes an electrical modulator 32 that encodes the data in a suitable modulation format, the choice of which may depend on a variety of factors. The encoded data stream is converted from serial to parallel to provide the sub-channels and is directed to an inverse fast Fourier Transform (IFFT) module 34 to transform it from the frequency domain to the time domain. The resulting RF OFDM signal is then converted back to serial data and directed to a digital-to-analog converter (DAC) 35 for converting the digital data stream into an analog data stream. The electrical processing unit 33 then passes the analog data stream to the optical processing unit 30 for transforming the RF data stream into an optical OFDM signal. Optical processing unit 30 includes an optical modulator 42 that receives the RF OFDM signal and modulates it onto an optical carrier generated by a light source 44 (e.g., a laser), thereby generating the OFDM signal that is transmitted to the OFDM receiver 20 over the optical transmission medium 31.

The OFDM receiver 20 is essentially the inverse of the OFDM transmitter 10 and includes an electrical processing unit 60 and an optical processing unit 50. The optical processing unit 50 has an optical detector 54 such as a photodetector in order to transform the optical signal back to an RF signal. The optical detector 54 then passes the RF OFDM signal to the electrical processing unit 60 in which the analog signal is first converted to a digital signal by analog-to-digital converter 62. As will be explained in more detail below, a synchronization module 63 detects the header of each frame in the digital signal to thereby detect the beginning of each frame. The digital signal then undergoes serial to parallel conversion and is transformed from the time domain to the frequency domain by a fast Fourier Transform (FFT) module 64, after which it is again converted to a serial data stream. An electrical demodulator 66 then demodulates each sub-carrier separately from one another in the frequency domain to provide the output data to a desired destination 70.

At least some of the components in FIG. 1 may be implemented in software while other components may be implemented by configurable hardware or a mixture of software and configurable hardware. For instance, the FFT blocks and the IFFT blocks described in the present disclosure document may be implemented as configurable software algorithms. Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment, for instance, the Fast Fourier Transform functions and the Inverse Fast Fourier Transform functions may be replaced by Discrete Fourier Transform (DFT) functions and Inverse Discrete Fourier Transform (IDFT) functions, respectively.

Figure 3:
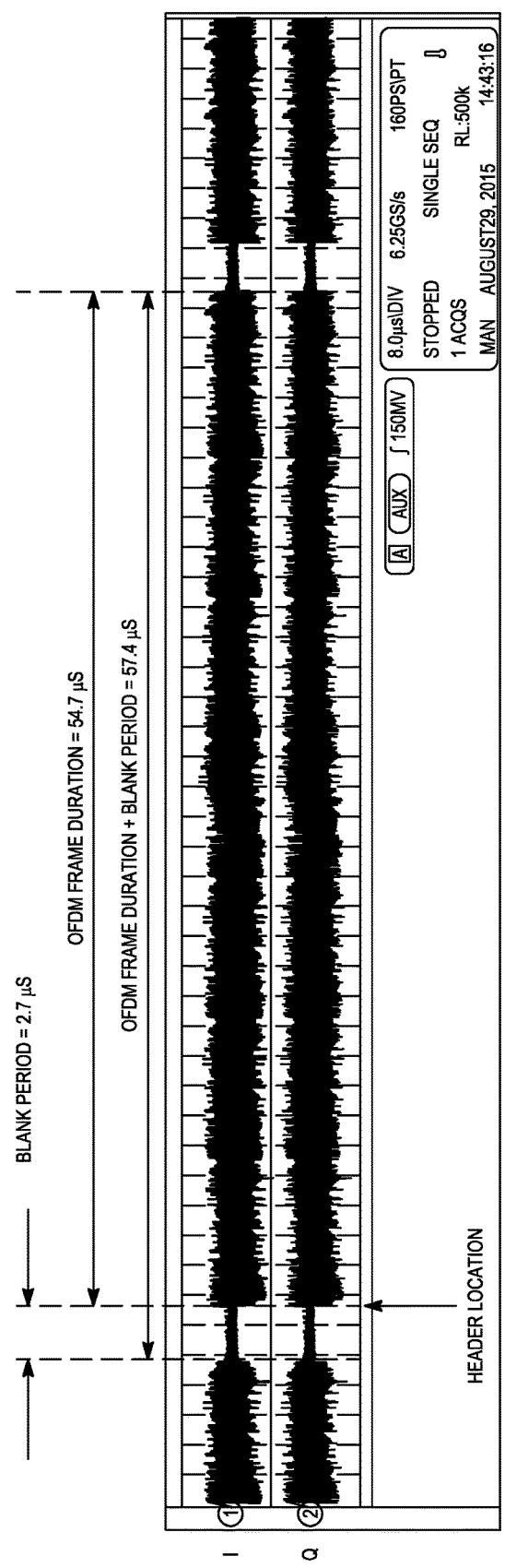
FIG. 3 shows one example of the temporal structure of an OFDM frame.

For purposes of illustration and not as a limitation on the subject matter described herein, one particular implementation of the synchronization module 63 shown in FIG. 1 will be described. This implementation will be illustrated with reference to an OFDM frame that has the following temporal structure. Of course, the techniques described herein are equally applicable to OFDM frames having different structures as well. In this example the transmitter uses a 512 point IFFT and digital to analog converters (DACs) running at 2 GSa/s. Likewise, the receiver uses analog to digital converters (ADCs) that also run at 2 GSa/s. One IFFT frame is 256 ns in duration. 214 such IFFT frames are transmitted to form one OFDM frame 54.7 μs in duration, as shown in FIG. 3. This is followed by a blank period of 2.7 μs. The OFDM frame and blank period combination is repeated every 57.4 μs.

Figure 4:
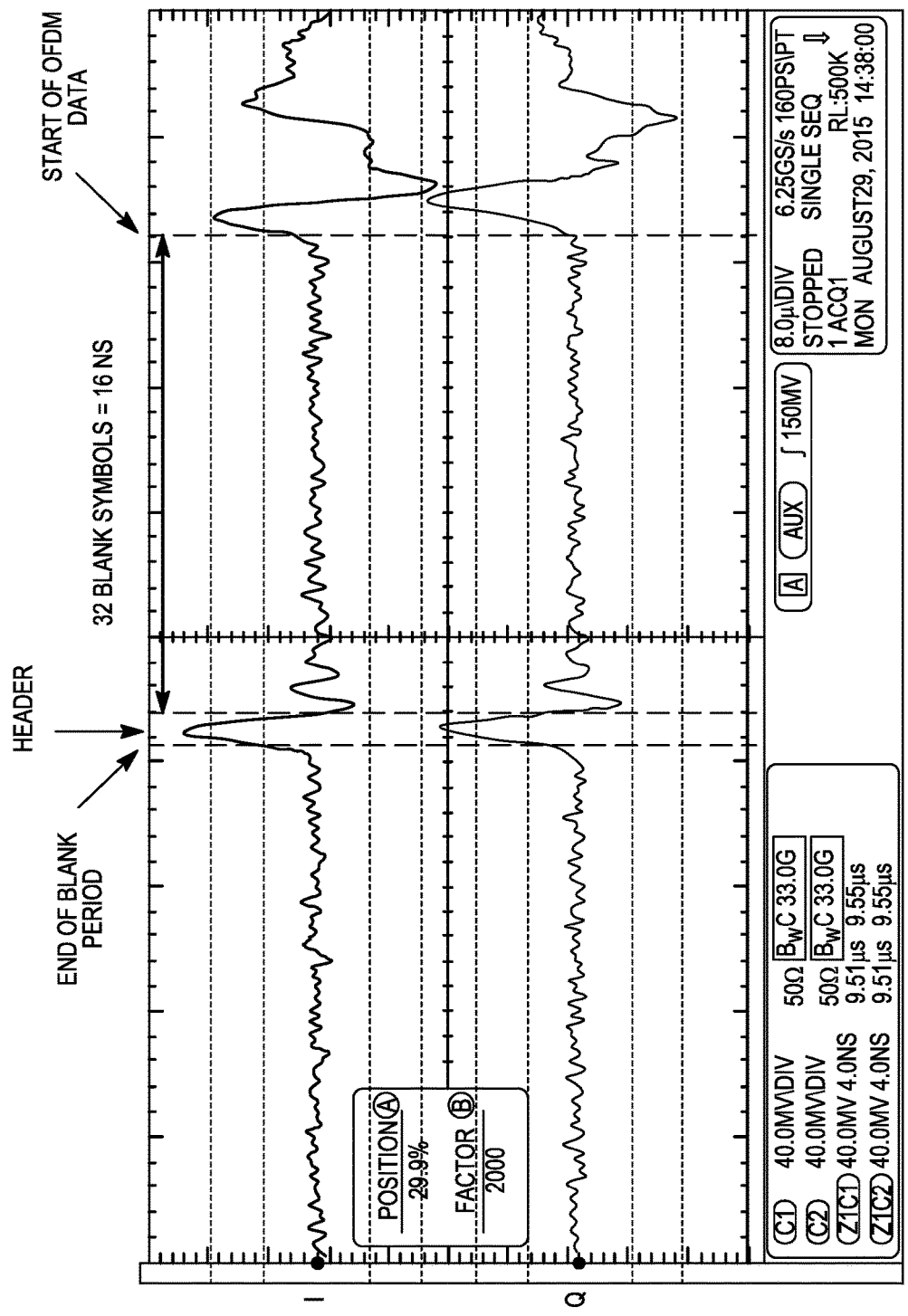
FIG. 4 shows the temporal structure of the OFDM frame shown in FIG. 3 in the vicinity of the header.

In accordance with one aspect of the techniques described herein, every OFDM frame begins with a single pulse—the header, as shown in the timing diagram FIG. 4. The header is placed on both the in-phase (I) and the quadrature (Q)

outputs of the complex OFDM signal. This is followed by a blank period of 16 ns. The OFDM data commences at the end of the blank period.

Frame synchronization relies on the detection of the header on either the I or the Q inputs of the receiver. Since coherent detection is employed, the inherent random phase drift between the carrier/local oscillator and the signal causes the amplitude of the headers on the I and Q inputs to wax and wane in a complementary manner. This can be seen in FIGS. 5A-5H, where 8 representative phase positions of the header in the complex plane and the corresponding time domain I and Q waveforms are shown. The receiver hardware employs digital comparator circuits with 4 configurable threshold levels—the upper_threshold2 and the lower_threshold2, which may be symmetric about the zero amplitude of the I and Q inputs and are set lower i.e. closer to the zero amplitude to enable detection of the start of the OFDM frame. The upper_threshold and the lower_threshold also may be symmetric about the zero amplitude of the I and Q inputs and are set higher i.e. further away from the zero amplitude to enable setting of the data shifting logic in a predictable manner. The important point to note in FIGS. 5A-5H is that irrespective of the received phase position of the header, the header component in either the I or Q input will always breach upper_threshold2 or lower_threshold2. Hence, this arrangement provides a method to determine the start of the OFDM frame irrespective of the instantaneous phase of the carrier/local oscillator.

It should be noted that this method of frame synchronization provides OFDM symbol level synchronization accuracy. In order to achieve sub-symbol level synchronization accuracy, frequency domain training symbols/pilots can be transmitted every OFDM frame and can be used at the receiver to compensate for sub-symbol temporal offset. These pilot frequencies can also be used to compensate for the dispersion in optical fiber and can therefore be implemented most efficiently after the FFT operation. For this reason, we do not include sub-symbol level synchronization in our proposed method of synchronization.

Figure 6:
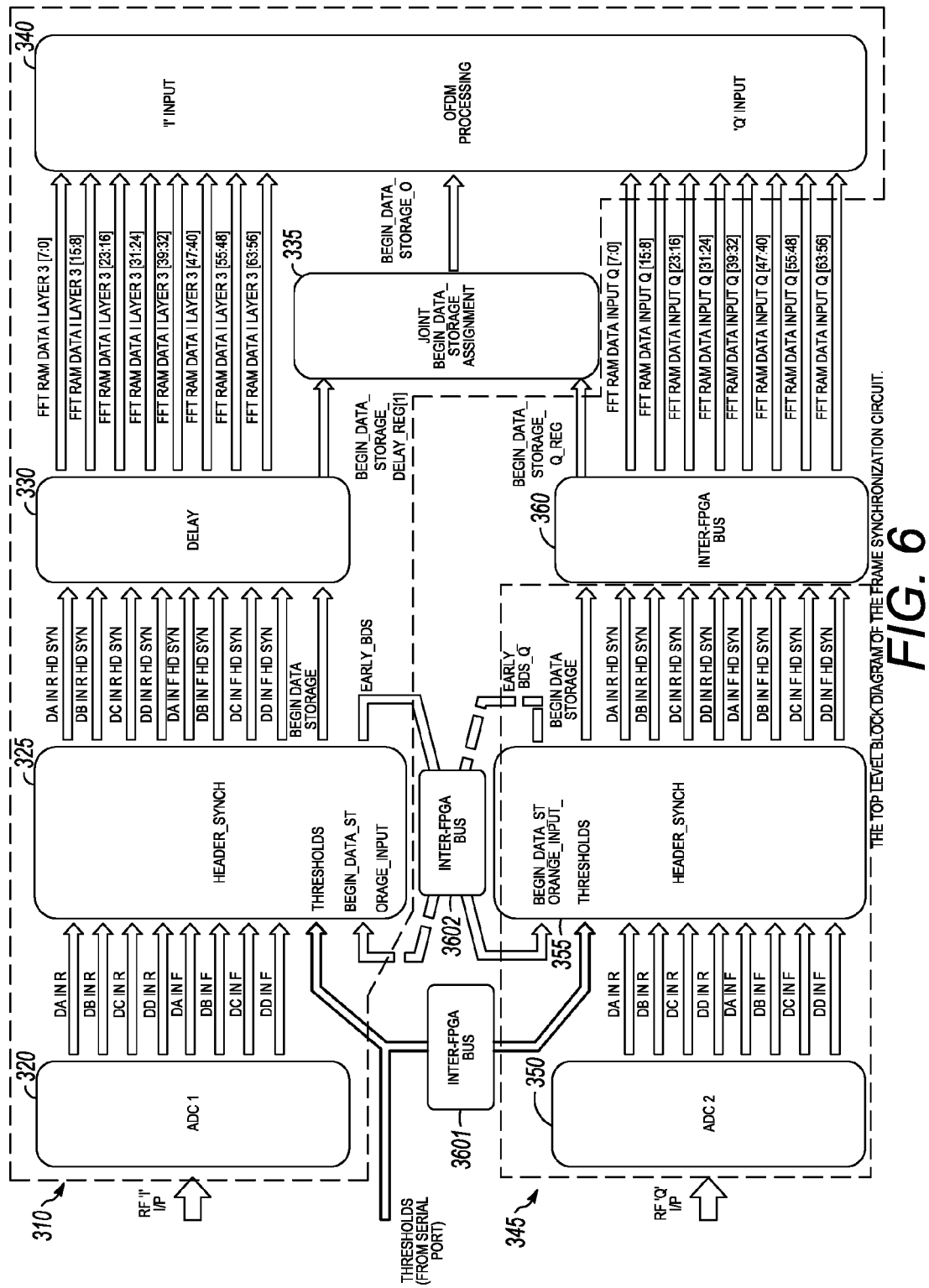
FIG. 6 shows one particular implementation of the synchronization module employed in the receiver shown in FIG. 1, which may be used to perform the frame synchronization technique described herein.

FIG. 6 shows one particular implementation of the synchronization module 63 shown in FIG. 1, which may be used to perform the frame synchronization technique described above. In this implementation two BEE3 Virtex 5 Field Programmable Gate Arrays (FPGAs) are employed. A primary FPGA 310, encompassed by the dashed lines in FIG. 6, includes analog-to-digital converter (ADC) 320, a header synchronization module 325, a delay module 330, a joint begin_data_storage 335 that functions as an OR gate, and an OFDM module 340 on which the functionality of FFT block 64 in FIG. 1 is implemented. A secondary FPGA 345 includes ADC 350 and header synchronization module 355. An inter-FPGA bus establishes communication between the various modules of the two FPGAs 310 and 345. For purposes of clarity the inter-FPGA bus is depicted in FIG. 6 by three blocks 3601 3602 and 360, which represent different portions of a common bus. In one particular implementation, the 2 ADCs 320 and 350 run at 2 GSa/s each and the 2 FPGAs are clocked at 250 MHz.

The ADC 320 receives the I input component of the OFDM signal and the ADC 350 receives the Q input component of the OFDM signal. The ADC 350 routes the Q component from the secondary FPGA 345 to the primary FPGA 310 using the inter-FPGA communication bus 360. The 4 threshold levels are set using serial port based commands from the user and both FPGAs use the same threshold values.

Data output from each ADC 320 and 350 consists of 8 lines in chronological order of sampling at the respective ADC, each consisting of 8 bits and updated every 4 ns (explained further in FIG. 9). da_in_r represents the earliest sample in each 4 ns period while dd_in_f represents the latest sample in each 4 ns period.

The header_synch modules 325 and 355 are implemented immediately after each respective ADC i.e., for each of the I and Q input components. The two tiered threshold levels allows the frame synchronization process to be divided into a coarse acquisition step and a fine acquisition step. As previously mentioned, the upper_threshold2 and lower_threshold2 are set lower i.e., closer to the zero level of the I and Q inputs to ensure that the begin_data_storage signal from either the I or the Q header_synch modules 325 and 355 will be set to 1 when a new OFDM frame arrives. This is the coarse acquisition step and will occur at the start of every OFDM frame.

The fine acquisition step occurs whenever the header breaches the upper_threshold or the lower_threshold for either the I or Q input components, which enables the header_synch module to shift data individually for the I and the Q inputs based on the temporal position of the received header. As can be seen from FIGS. 5A-5H, the header may not breach upper_threshold or lower_threshold for either I or Q inputs at the start of every OFDM frame and in this case the previous shifting position is held.

The inter-FPGA bus 360 has a propagation delay of 3 clock cycles of the 250 MHz clock i.e. 12 ns. This causes the data (fft_ram_data_input_Q) and begin_data_storage_Q_reg signal for the Q input component to arrive delayed by 3 clock cycles into the primary data processing FPGA 310. Hence, in order to ensure the co-incidence of data and signals for I and Q input components on the main data processing FPGA, the data (da_in_r_hd_syn to dd_in_f_hd_syn) and the begin_data_storage signals for the I input component are delayed by 3 clock cycles by the delay module 330.

The early_bds and early_bds_Q signals from the I and Q input header_synch modules 325 and 355 are respectively used to indicate to the Q and I header_synch modules 355 and 325 that a header was received and that all further activity in the header_synch module that did not receive the header should be suspended for the duration of the OFDM frame. This ensures that OFDM data in the OFDM frame is not misinterpreted as a header. Since early_bds and the early_bds_Q use the same inter-FPGA bus 360 with a 3 clock cycle i.e., a 12 ns propagation delay, a blank period of 16 ns is added after the header position as shown in FIG. 4. This ensures that the early_bds and the early_bds_Q signals arrive at the destination header_synch modules before the OFDM data can be misinterpreted as a header and corrupt the synchronization process.

The Joint begin_data_storage assignment module 335 performs the following 'OR' operation:

begin_data_storage_o=begin_data_storage_delay_reg[1] OR begin_data_storage_Q_reg Thus, the begin_data_storage_o signal, which indicates the start of valid data to the OFDM processing module 340, will be set to 1 whenever I or the Q header or both are detected.

Figure 7:
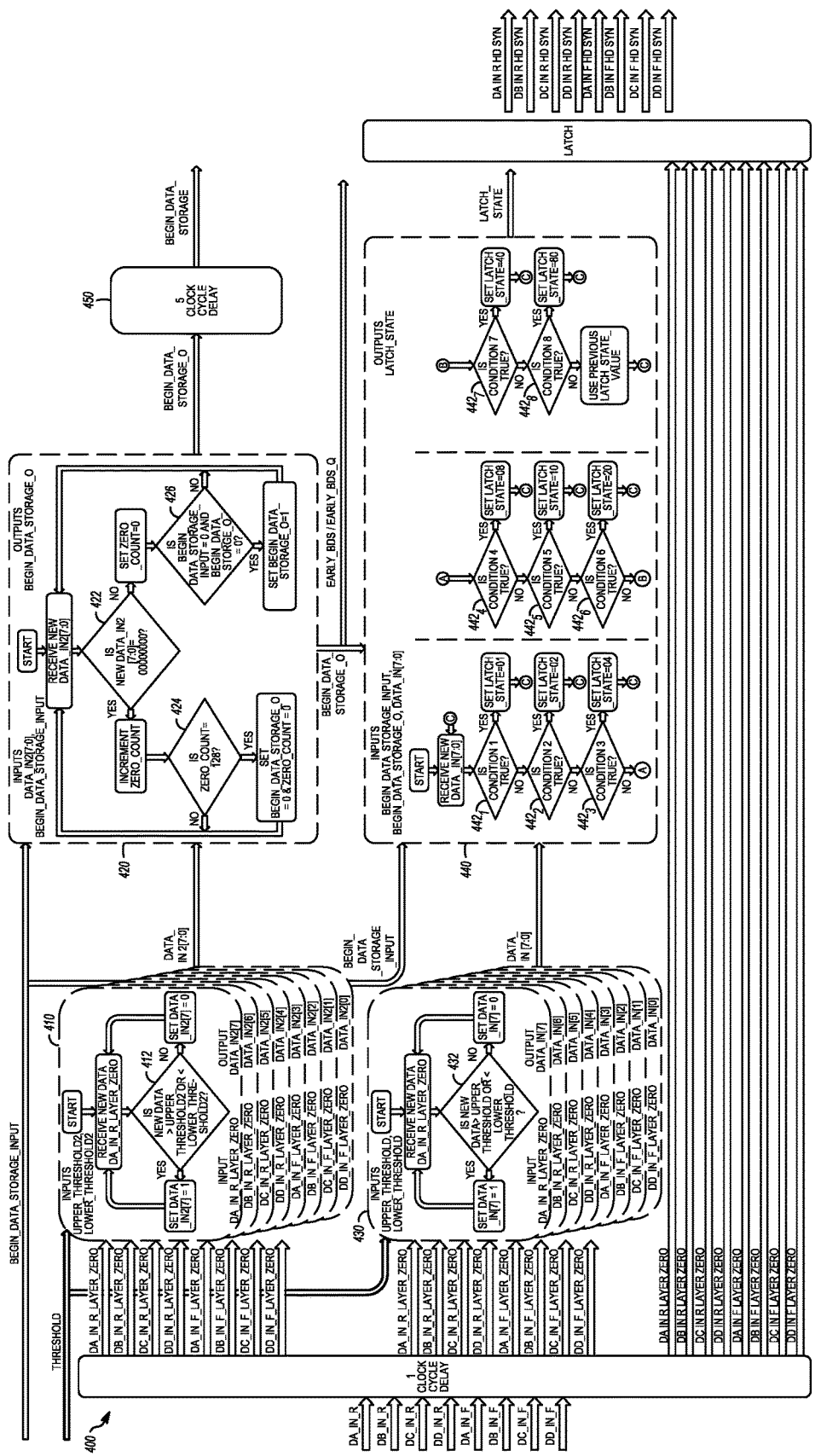
FIG. 7 shows a functional block diagram of one example of the header_synch modules shown in FIG. 6.
Figure 8A:
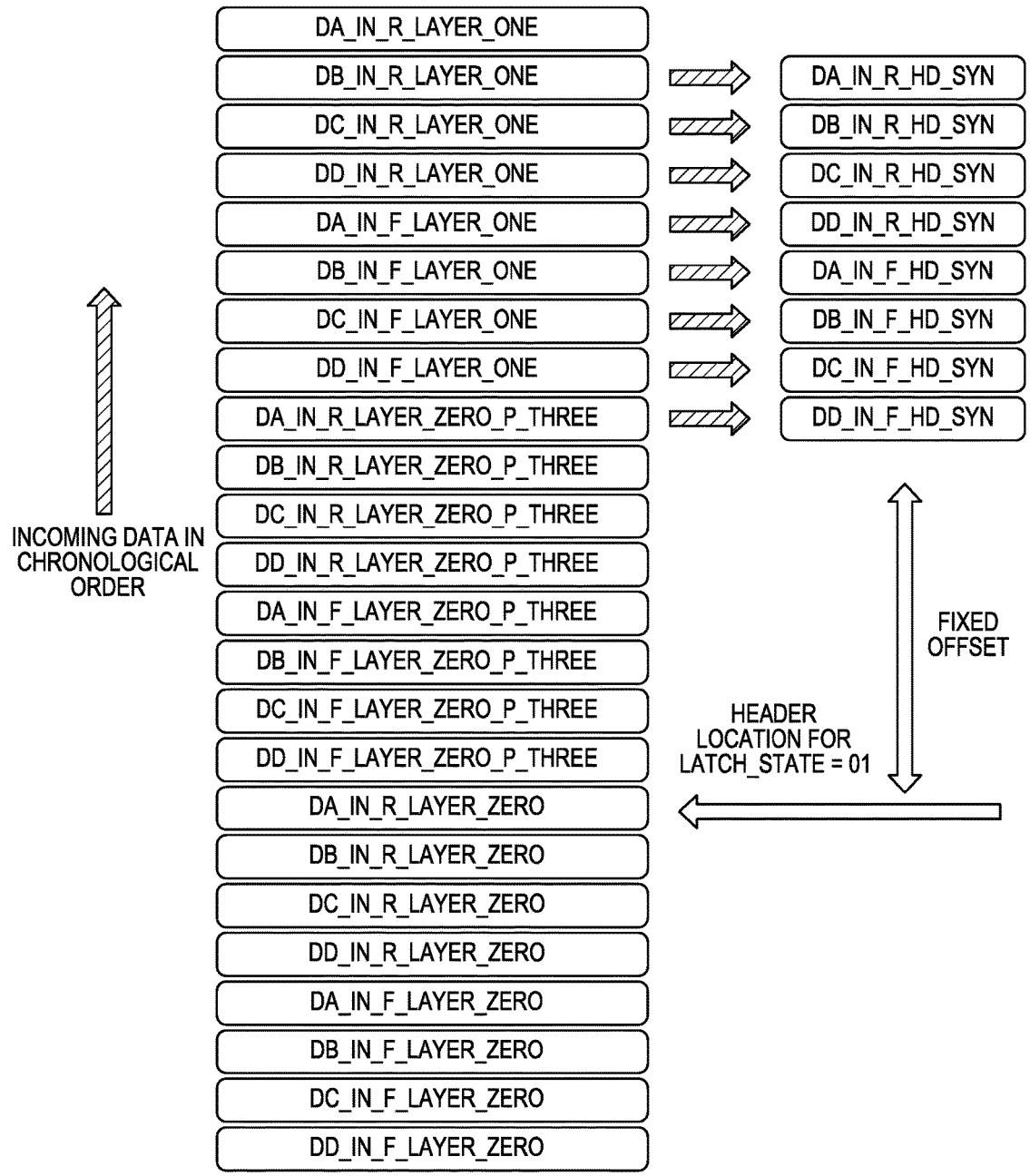
FIGS. 8A-8H show one example of the latch module shown in FIG. 7 in each of the 8 possible latch states.
Figure 8B:
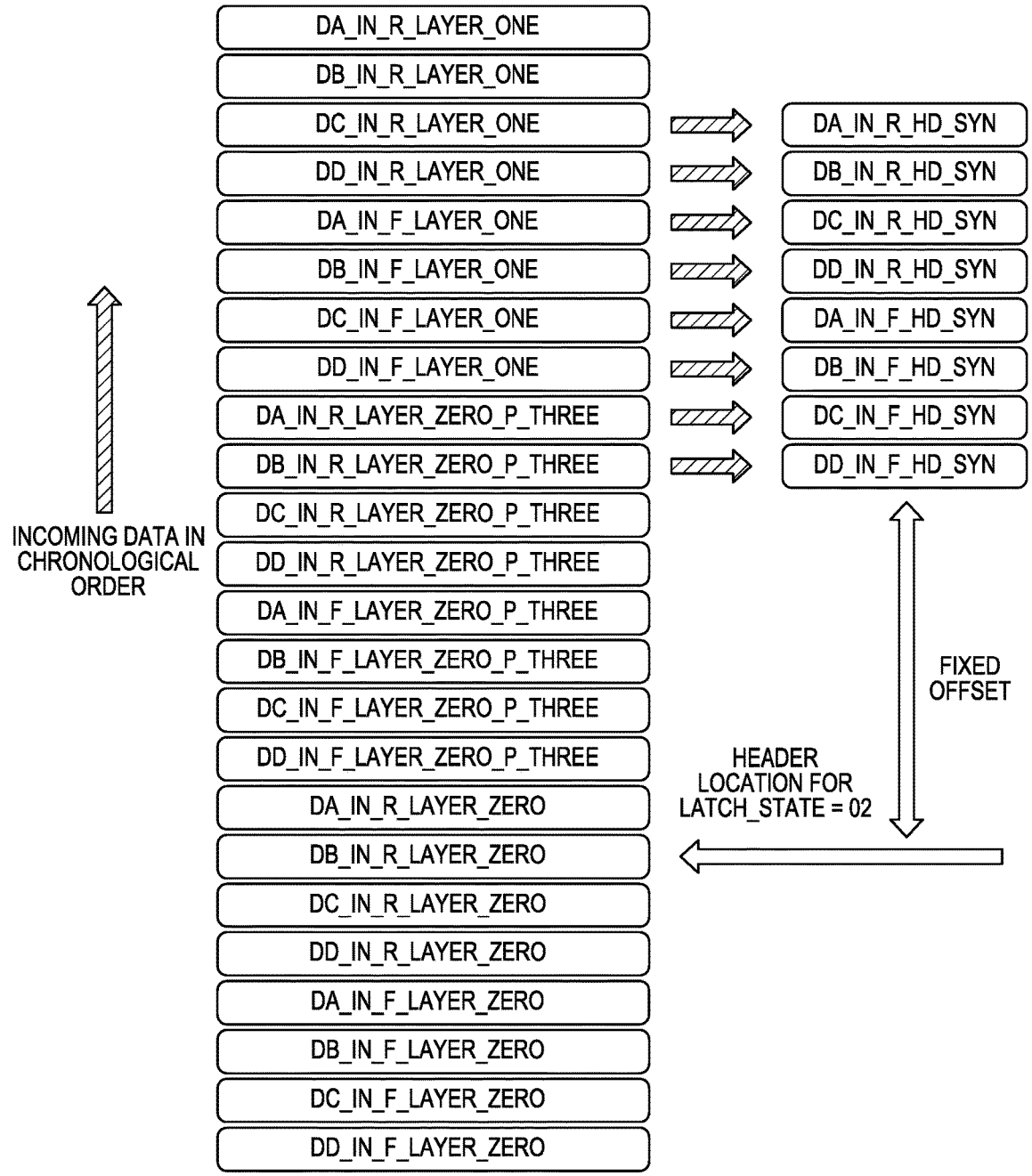
Figure 8C:
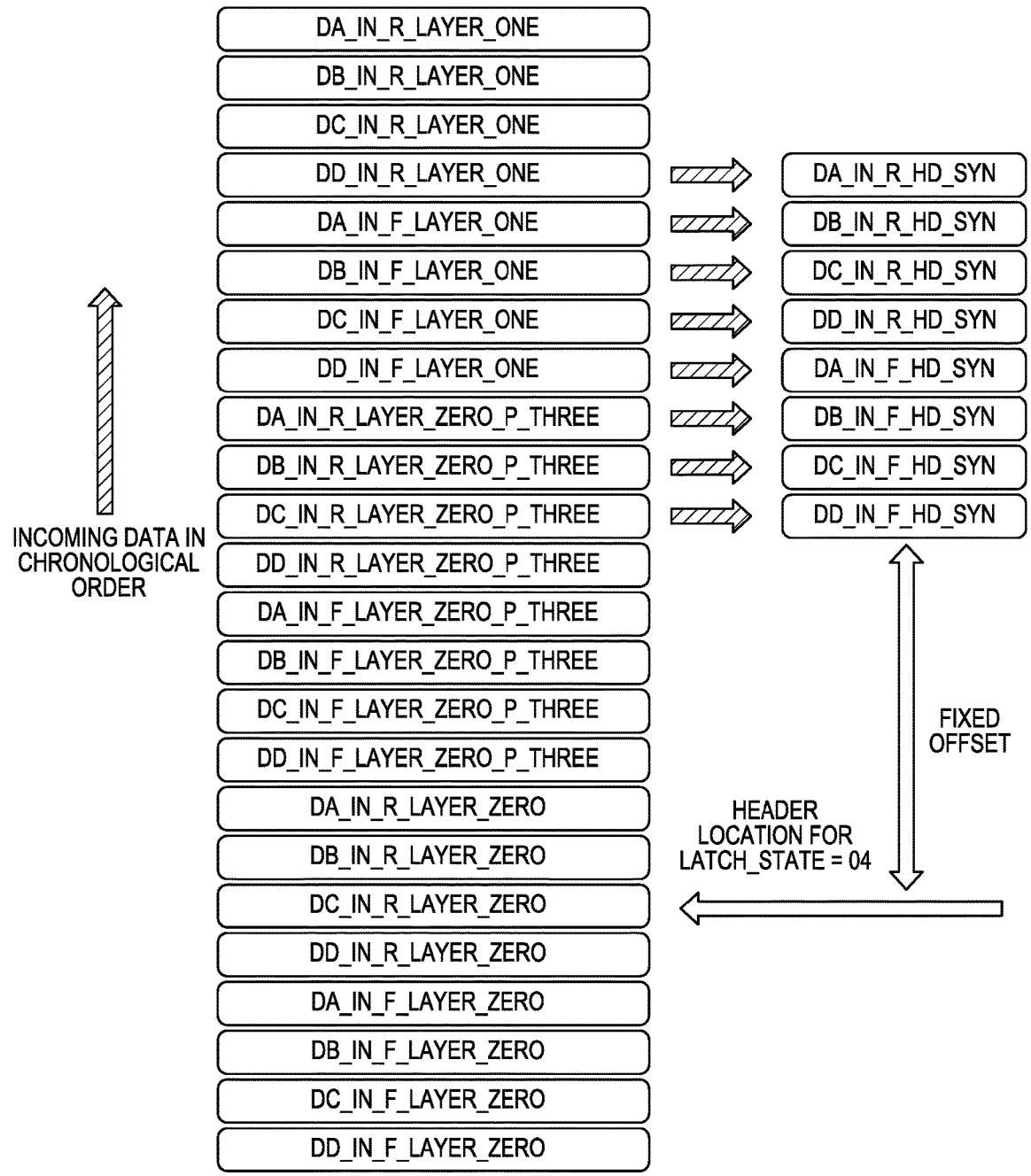
Figure 8D:
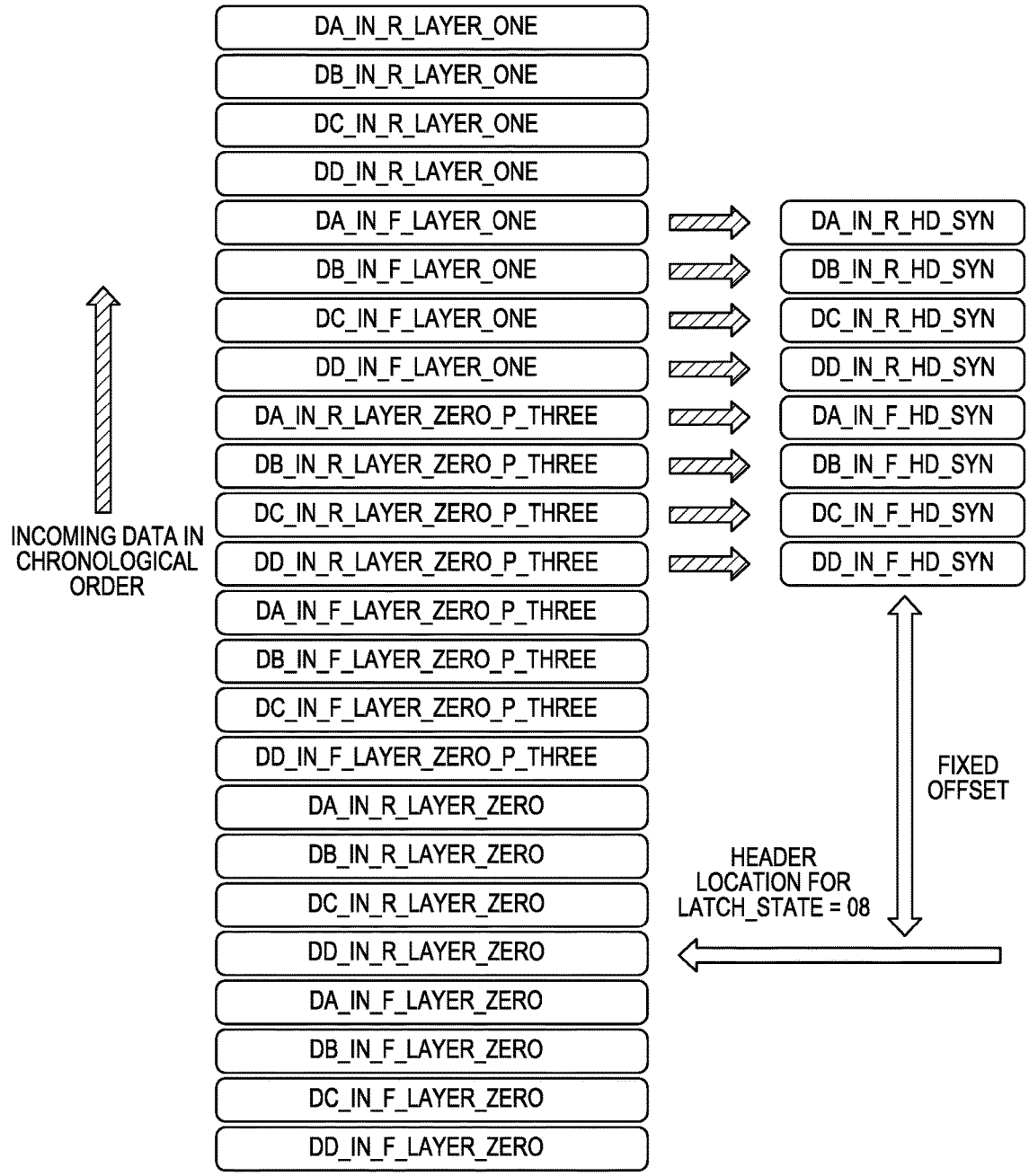
Figure 8E:
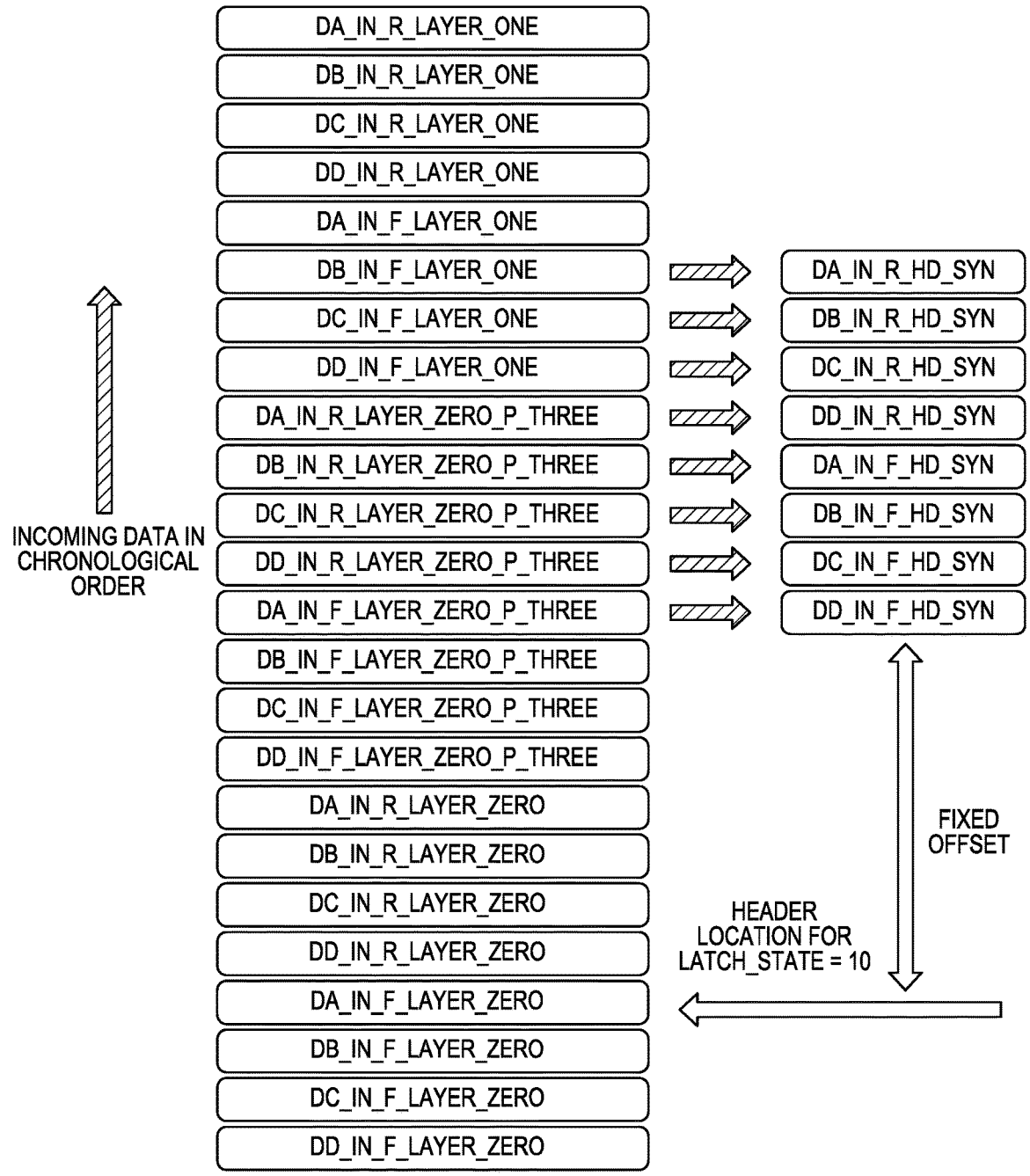
Figure 8F:
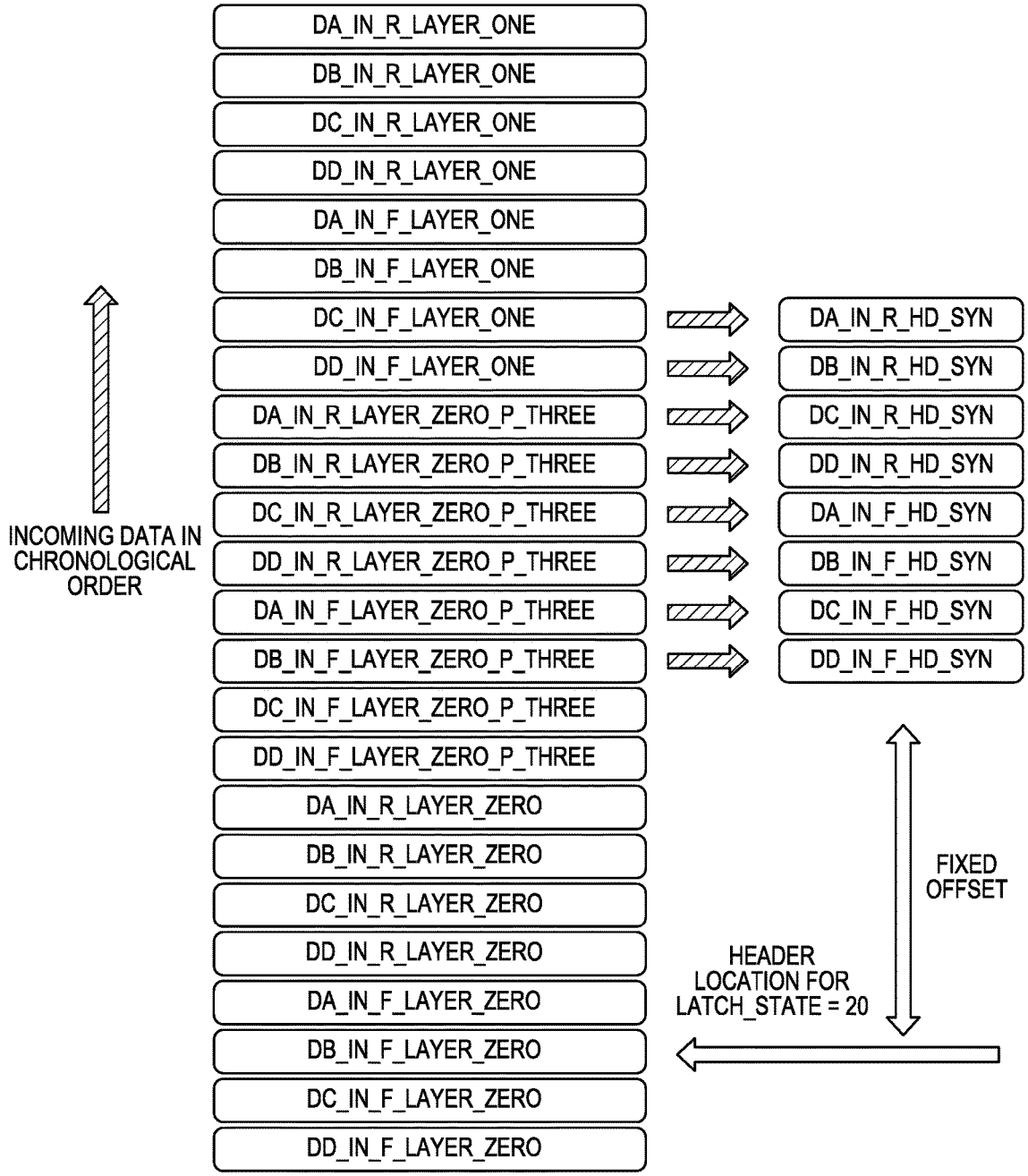
Figure 8G:
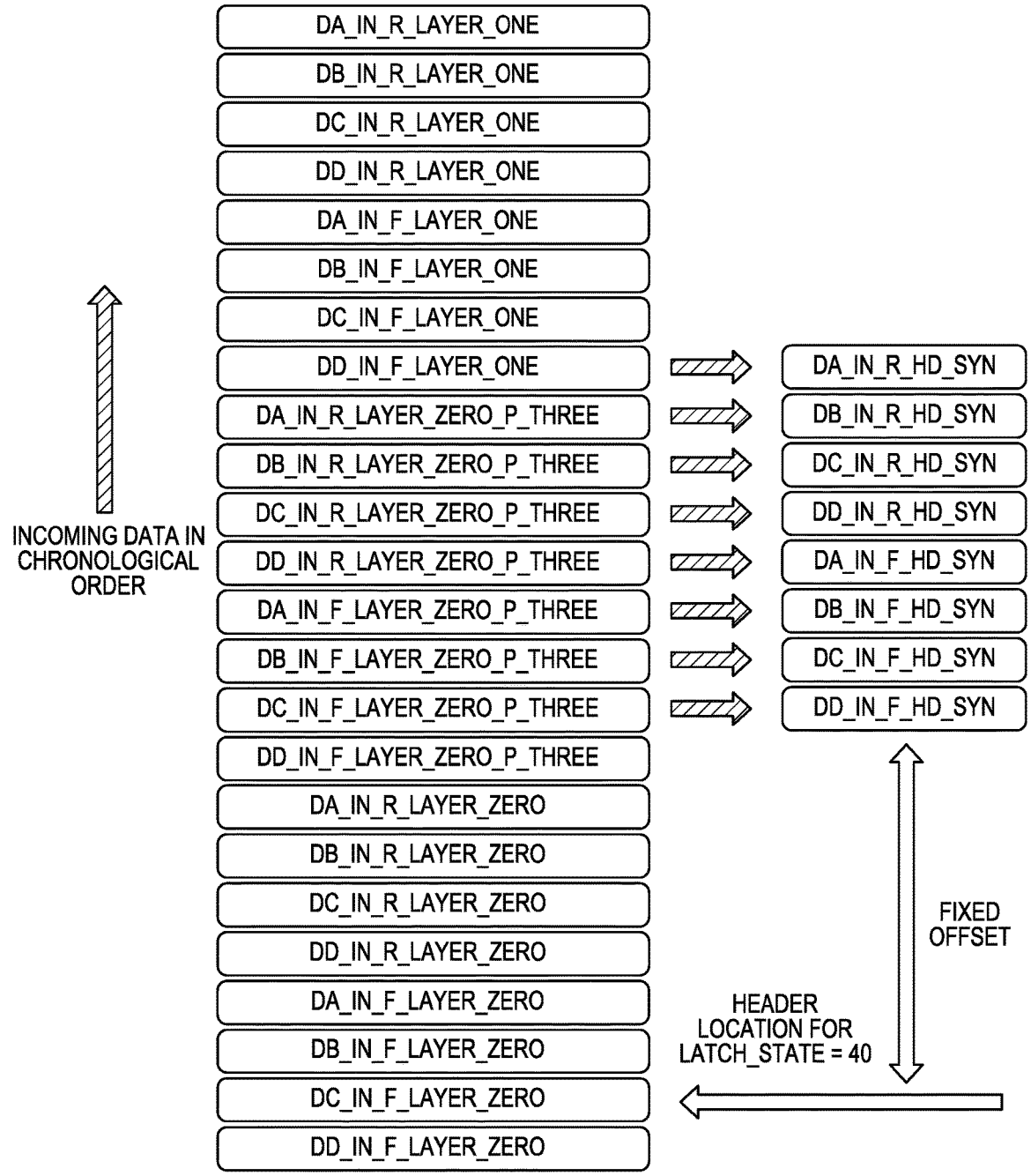
Figure 8H:
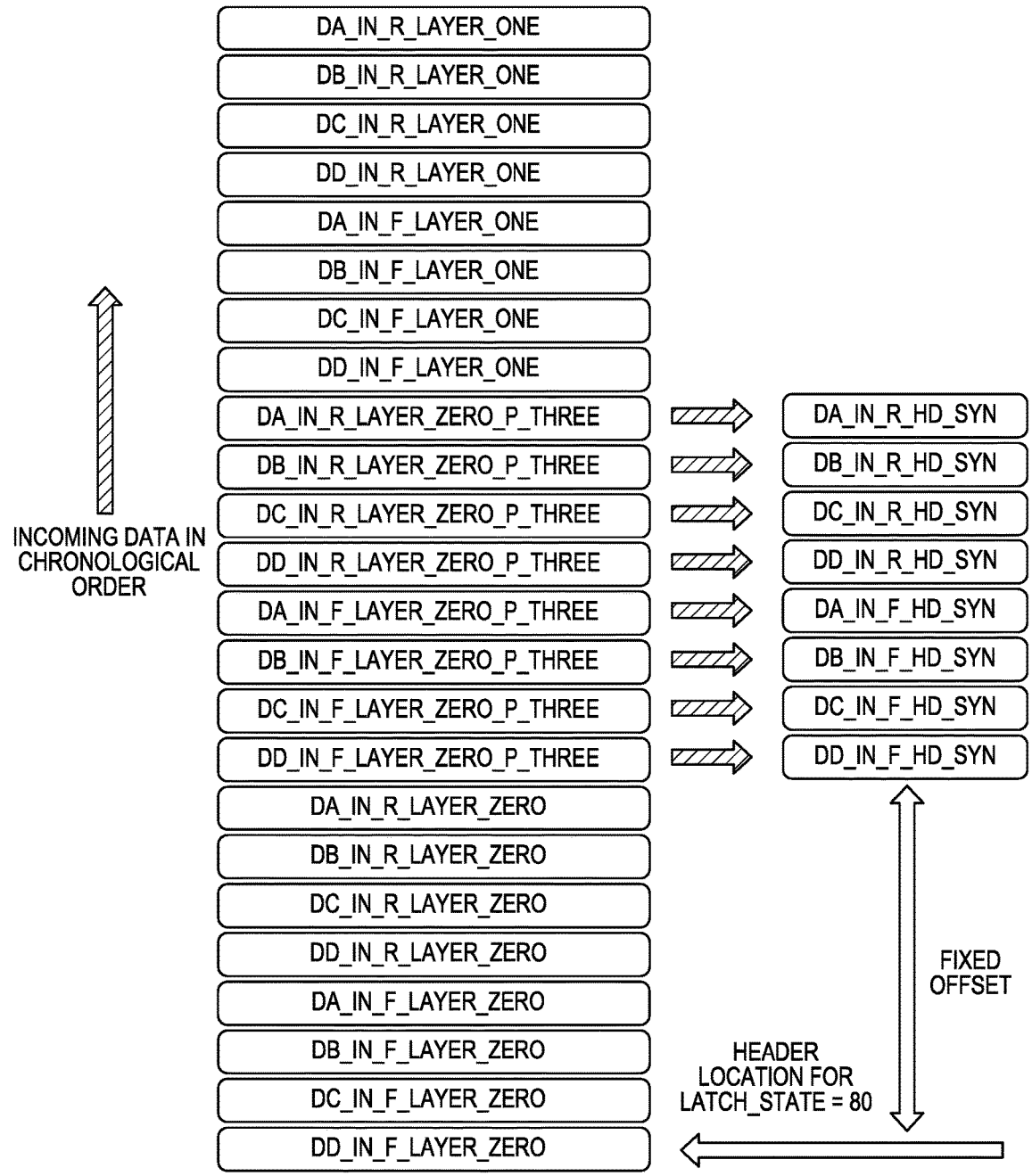

FIG. 7 shows a functional block diagram of one example of a header_synch module 400 that may be employed for each of the modules 325 and 355 in FIG. 6. In this example the header_synch module 400 includes four main processing sub-modules: a digital comparator module 410 for coarse synchronization, a begin data storage module 420, a digital comparator module 430 for fine synchronization and a decision circuit 440 for a latch.

The digital comparator module 410 for coarse synchronization uses a pair of digital comparators (indicated by decision block 412) to determine if the incoming data has breached the upper_threshold2 or lower_threshold2. If so, the data_in2 bit of the corresponding data line is set to 1. This process is repeated every 4 ns.

The begin data storage module 420 determines at decision block 422 if the value of data_in2 is 0 and at decision block 424 if all bits of data_in2 are 0 at least 128 times and, if so, sets the begin_data_storage_o signal to 0. This indicates that there are 128×8=1024 blank symbols transmitted and it is used to determine the blank period that follows each OFDM frame. The first instance of any bit of data_in2 found at decision block 422 to be 1 (which indicates a header was found) following the blank period is used to set begin_data_storage_o to 1. The begin_data_storage_input (early_bds/early_bds_Q) signal coming from the other FPGA is also checked for 0 level (at decision block 426) to ensure that the begin_data_storage_o is not set to 1 incorrectly by OFDM data if the other input (I or Q) has already detected a header. The begin_data_storage_o signal is delayed for five 250 MHz clock cycles by delay module 450 so that the setting of begin_data_storage to 1 coincides with valid data on the latch block data output lines (da_in_r_hd_syn to dd_in_f_hd_syn).

The digital comparator module 430 for fine synchronization uses a pair of digital comparators (indicated by decision block 432) to determine if the incoming data has breached the upper_threshold or lower_threshold. If so, the data_in bit of the corresponding data line is set to 1. This process is repeated every 4 ns. The position of 1 in data_in determines the position of the header. For example, 00100000 for data_in indicates that the header was found in the 3rd data symbol in that particular 4 ns period. This case is depicted in FIGS. 9A-9C.

The decision circuit 440 for the latch sets the shifting position for the incoming data i.e., the latch_state based on the received position of the header as indicated by data_in. The conditions checked at the decision blocks 442$_1$-442$_8$ in the flowchart are as follows:
  a. Condition 1: begin_data_storage_input=0 AND begin_data_storage_o=0 AND data_in[7]=1
  b. Condition 2: begin_data_storage_input=0 AND begin_data_storage_o=0 AND data_in[7]=0 AND data_in[6]=1
  c. Condition 3: begin_data_storage_input=0 AND begin_data_storage_o=0 AND data_in[7]=0 AND data_in[6]=0 AND data_in[5]=1
  d. Condition 4: begin_data_storage_input=0 AND begin_data_storage_o=0 AND data_in[7]=0 AND data_in[6]=0 AND data_in[5]=0 AND data_in[4]=1
  e. Condition 5: begin_data_storage_input=0 AND begin_data_storage_o=0 AND data_in[7]=0 AND data_in[6]=0 AND data_in[5]=0 AND data_in[4]=0 AND data_in[3]=1
  f. Condition 6: begin_data_storage_input=0 AND begin_data_storage_o=0 AND data_in[7]=0 AND data_in[6]=0 AND data_in[5]=0 AND data_in[4]=0 AND data_in[3]=0 AND data_in[2]=1
  g. Condition 7: begin_data_storage_input=0 AND begin_data_storage_o=0 AND data_in[7]=0 AND data_in[6]=0 AND data_in[5]=0 AND data_in[4]=0 AND data_in[3]=0 AND data_in[2]=0 AND data_in[1]=1
  h. Condition 8: begin_data_storage_input=0 AND begin_data_storage_o=0 AND data_in[7]=0 AND data_in[6]=0 AND data_in[5]=0 AND data_in[4]=0 AND data_in[3]=0 AND data_in[2]=0 AND data_in[1]=0 AND data_in[0]=1

The latch module is implemented in this example as shown in FIGS. 8A-8H, which show the latch in each of the 8 possible latch states. The value of latch_state from the decision circuit 440 for the latch determines the set of data that will be selected so as to eliminate the effect of temporal offsets of the received data. This can be understood further in FIGS. 9A-9C, which are timing diagrams depicting the variation of the important signals in the header_synch module over time. In FIGS. 9A-9C "X" indicates "do not care" values.

Figure 9A:
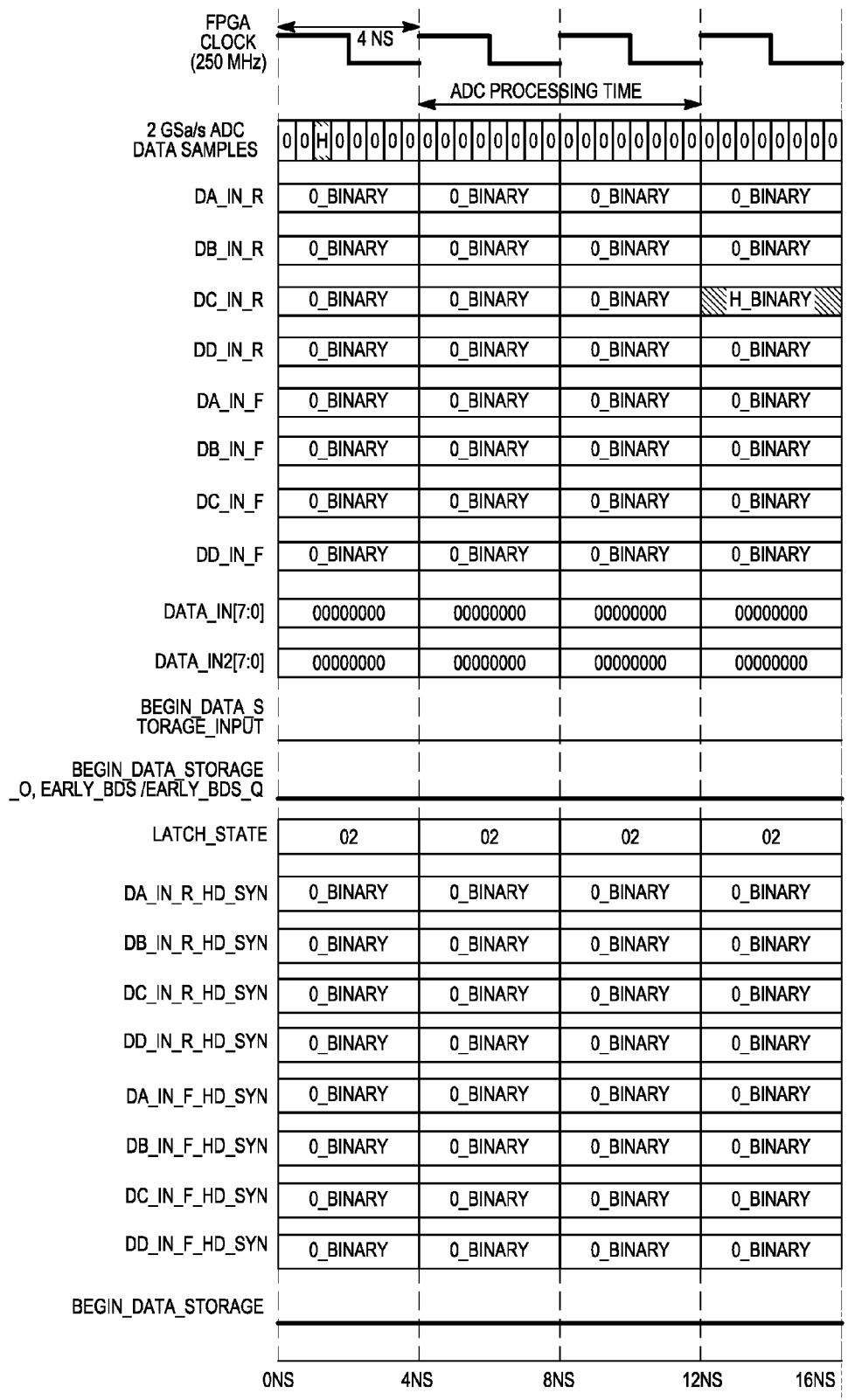
FIGS. 9A-9C are timing diagrams depicting operation of the header_synch module over time that sequentially increases from FIG. 9A to 9C.
Figure 9B:
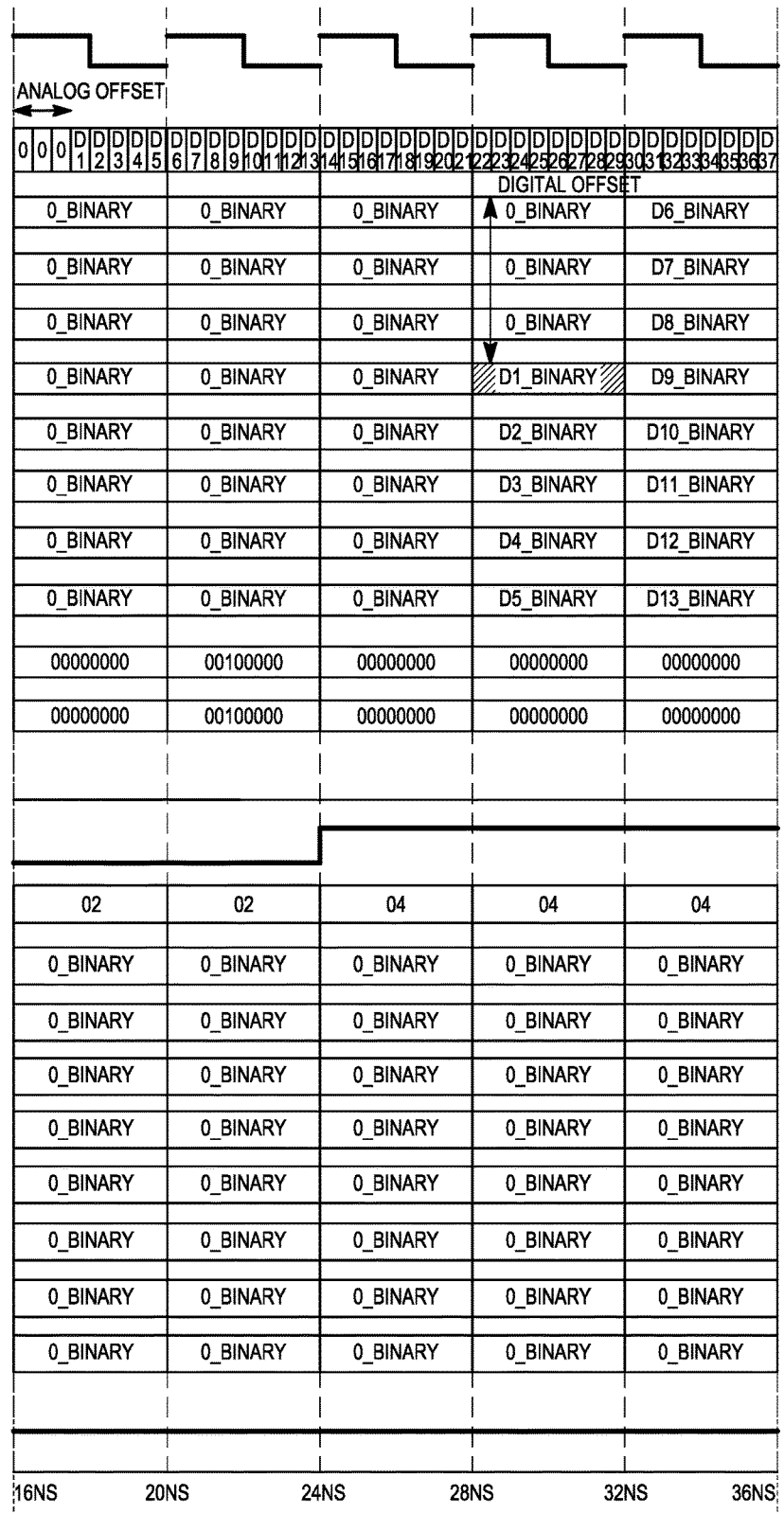
Figure 9C:
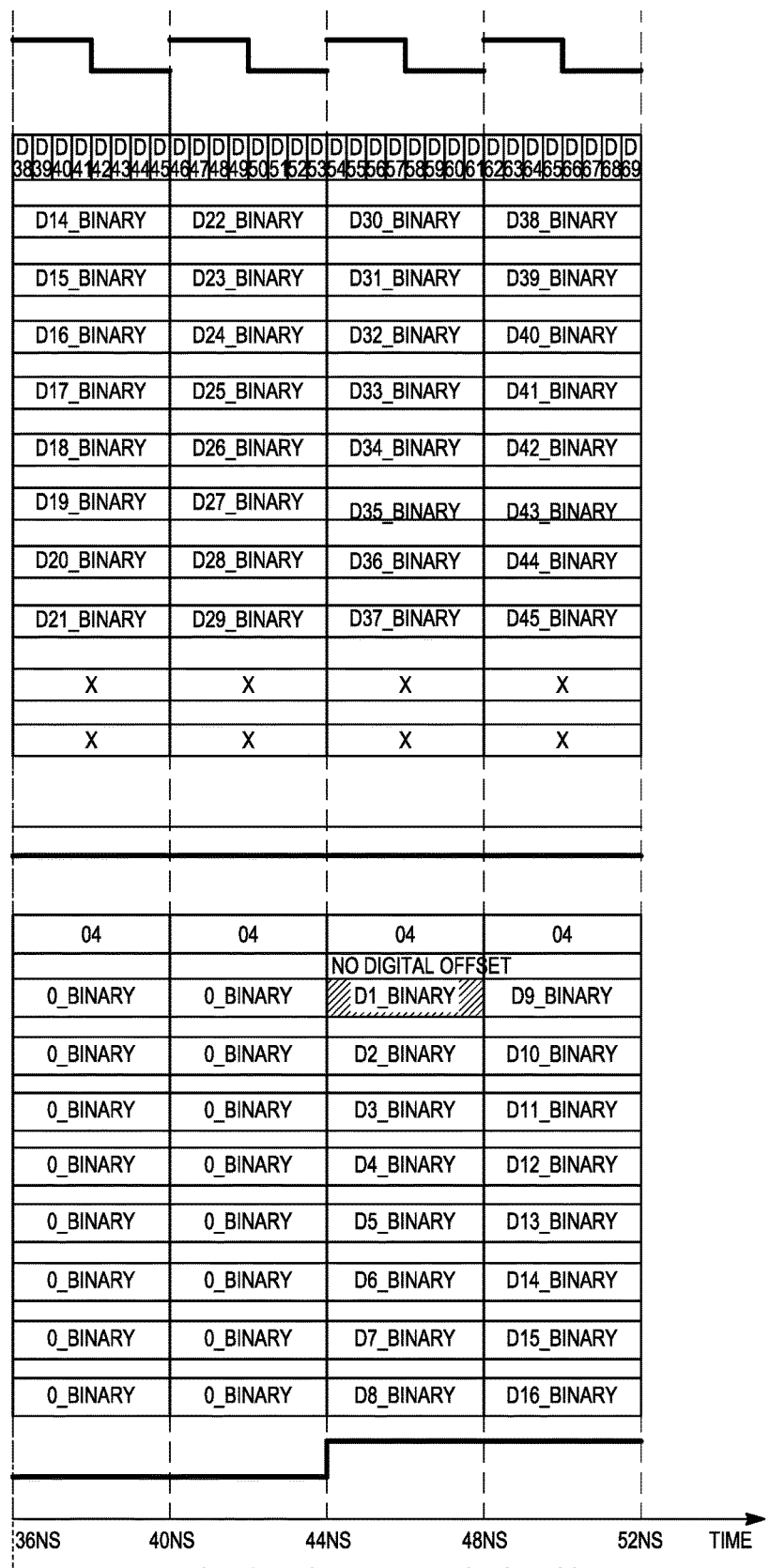
Figure 10A:
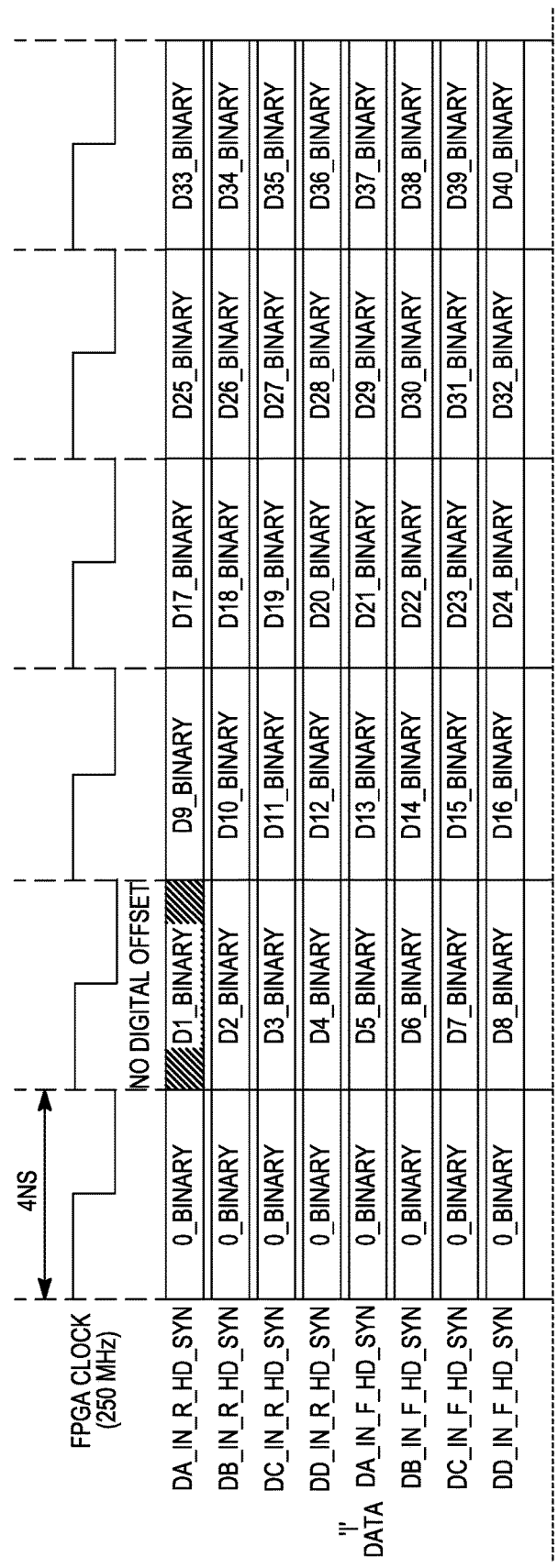
Figure 10C:
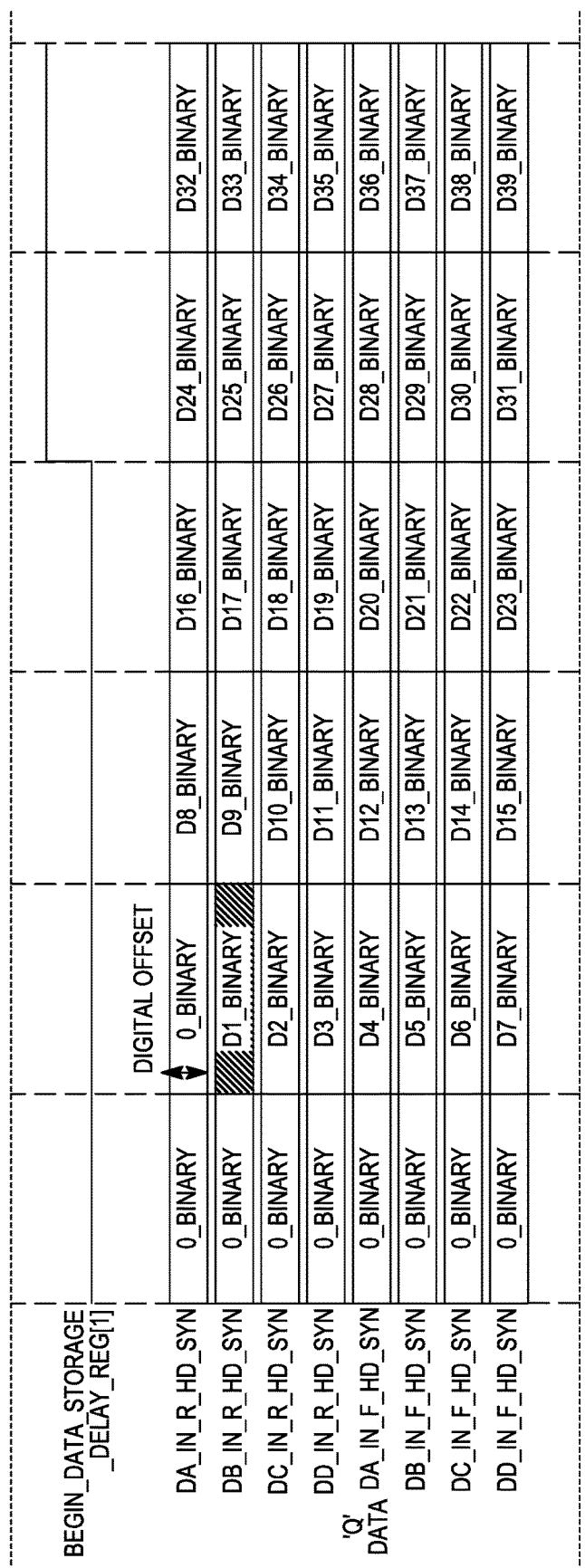

In FIGS. 9A-9C, the $3^{rd}$ ADC sample contains the header followed by 32 zero samples as shown in FIG. 4. The next sample is the $1^{st}$ OFDM data sample which has a temporal offset i.e. analog offset of 3 sample positions. This translates to a digital offset on the da_in_r to dd_in_f data lines. The scenario depicted in FIG. 9A-9C is that of the header breaching both thresholds i.e. upper_threshold/lower_threshold and upper_threshold2/lower_threshold2. Thus, 2 clock cycles after the appearance of the header on the da_in_r to dd_in_f data lines, data in and data_in2 each have a non-zero bit. In the next clock cycle, begin_data_storage_o is set to 1 and latch_state is set to its new value of 04. From the next clock cycle onwards, the Latch outputs da_in_r_hd_syn to dd_in_f_hd_syn carry the correct shifted data with the digital offset eliminated. This is most visible with the data corresponding to the $1^{st}$ OFDM sample—D1_binary appearing on the da_in_r_hd_syn data line. Thus, from the time the header appears on the da_in_r to dd_in_f data lines, it takes the header_synch circuit just 4 clock cycles i.e. 16 ns to determine the header's new temporal offset, configure the Latch and to output the correct shifted data with no digital offset on the Latch output lines. The signal begin_data_storage, which is a 5 clock cycle delayed version of begin_data_storage_o, is set to 1 at the same time valid data appears on the latch output lines (da_in_r_hd_syn to dd_in_f_hd_syn).

Figure 5B:
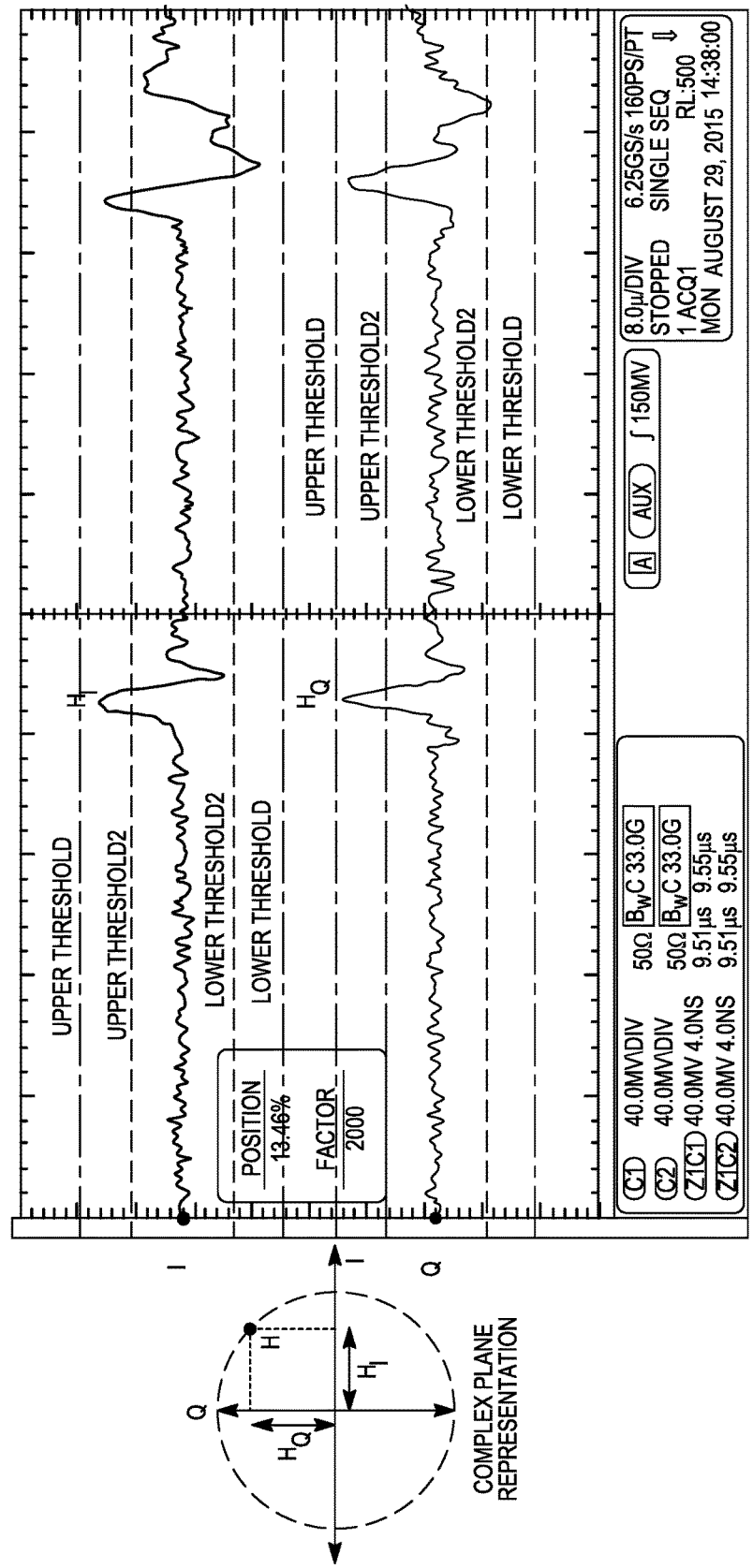
Figure 5C:
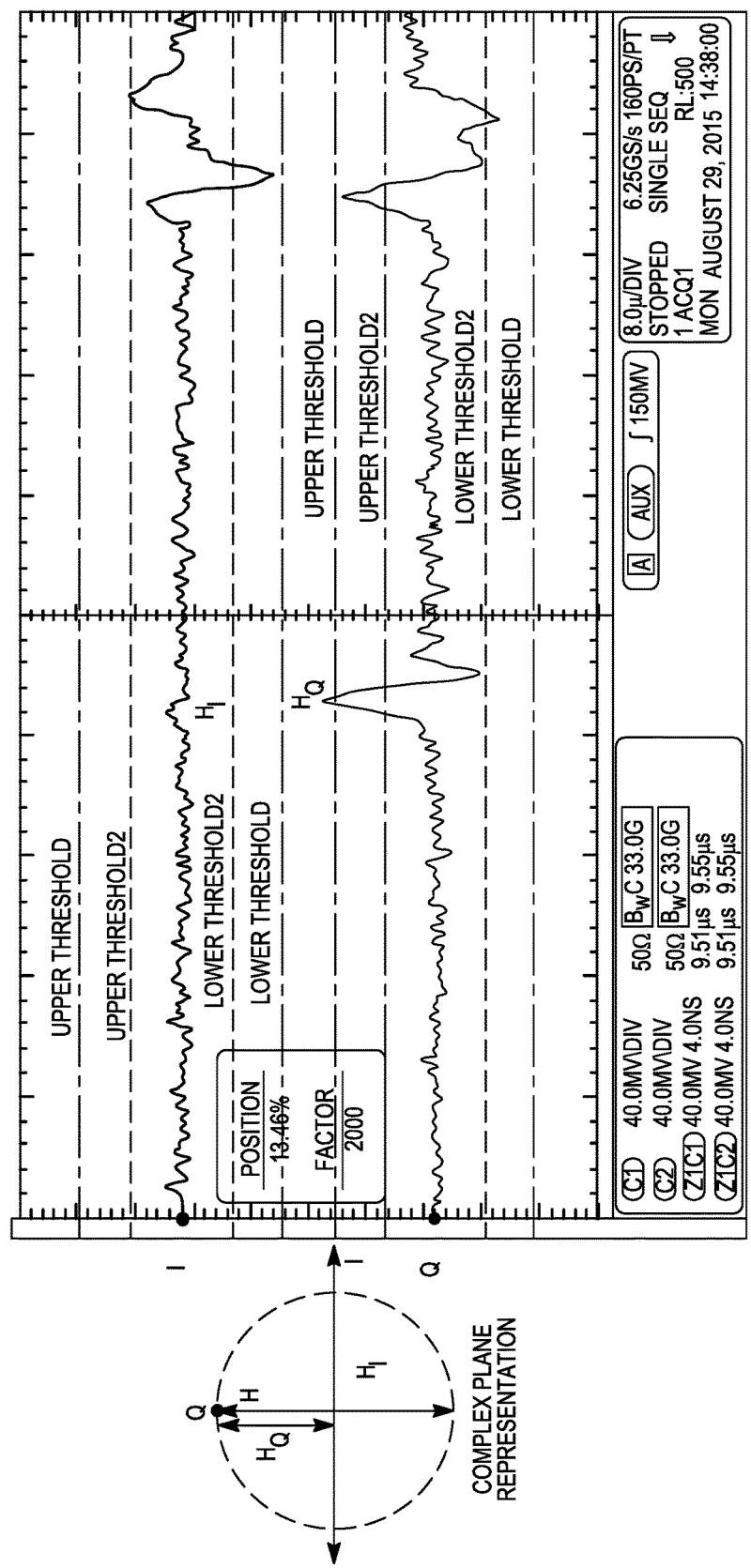
Figure 5D:
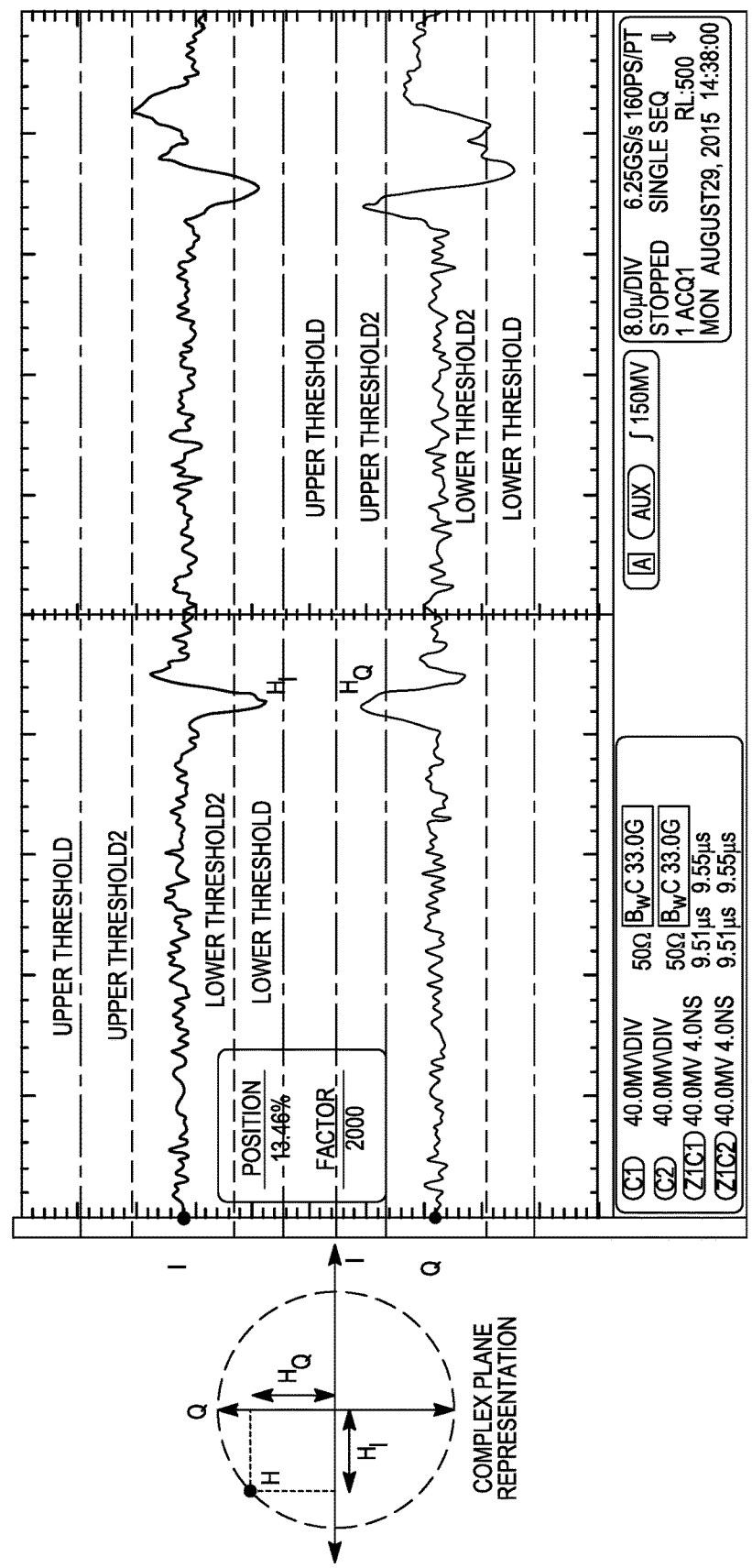
Figure 5E:
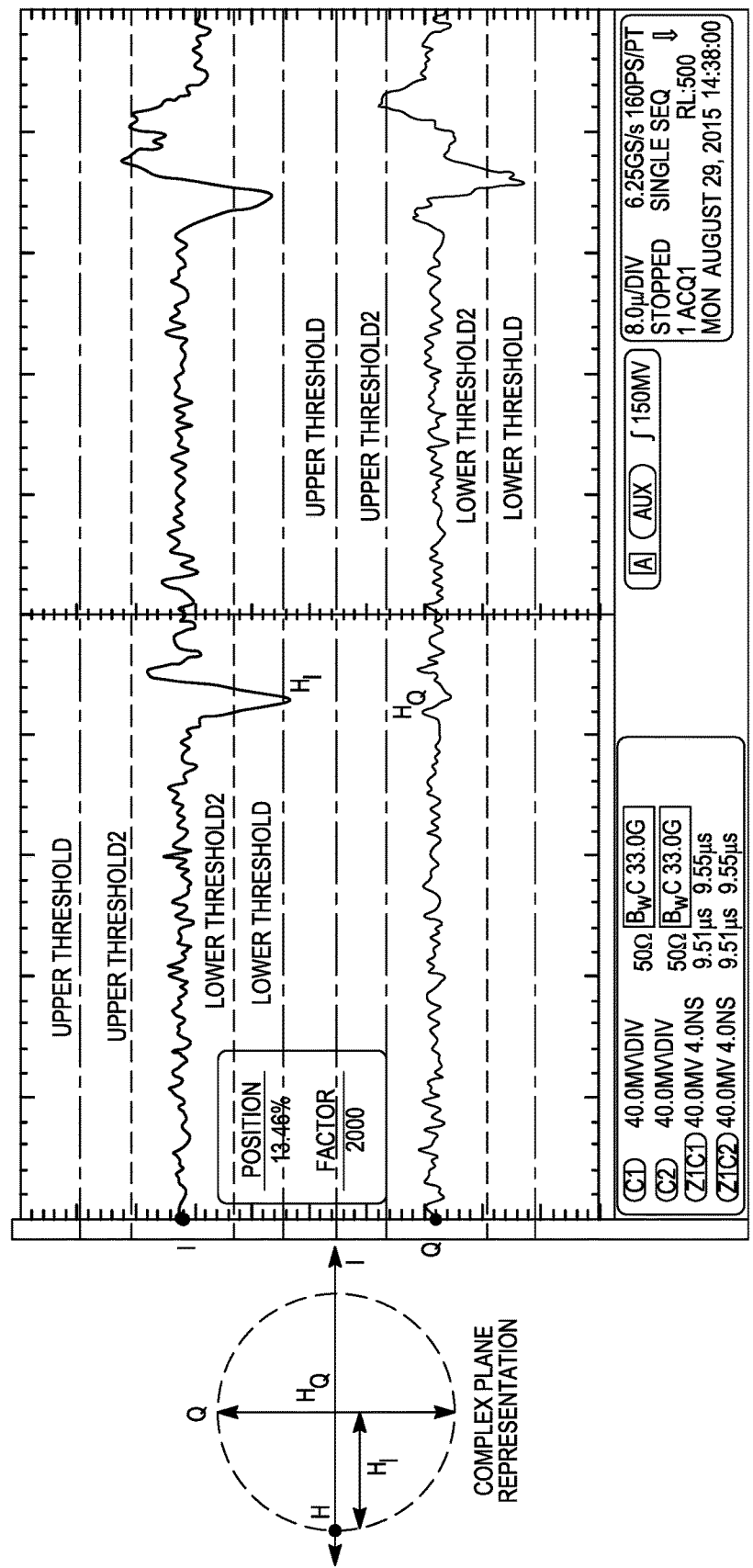
Figure 5F:
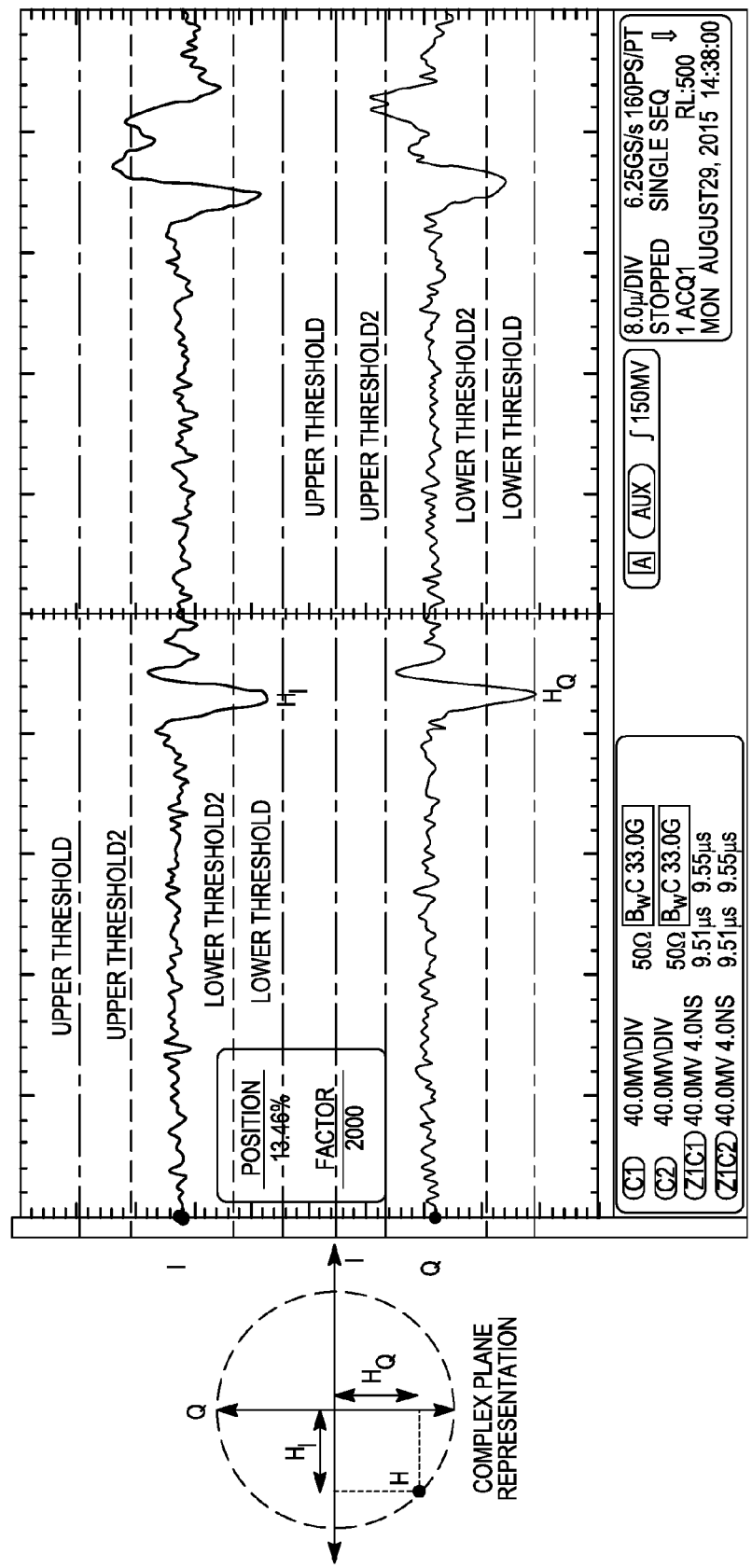
Figure 5G:
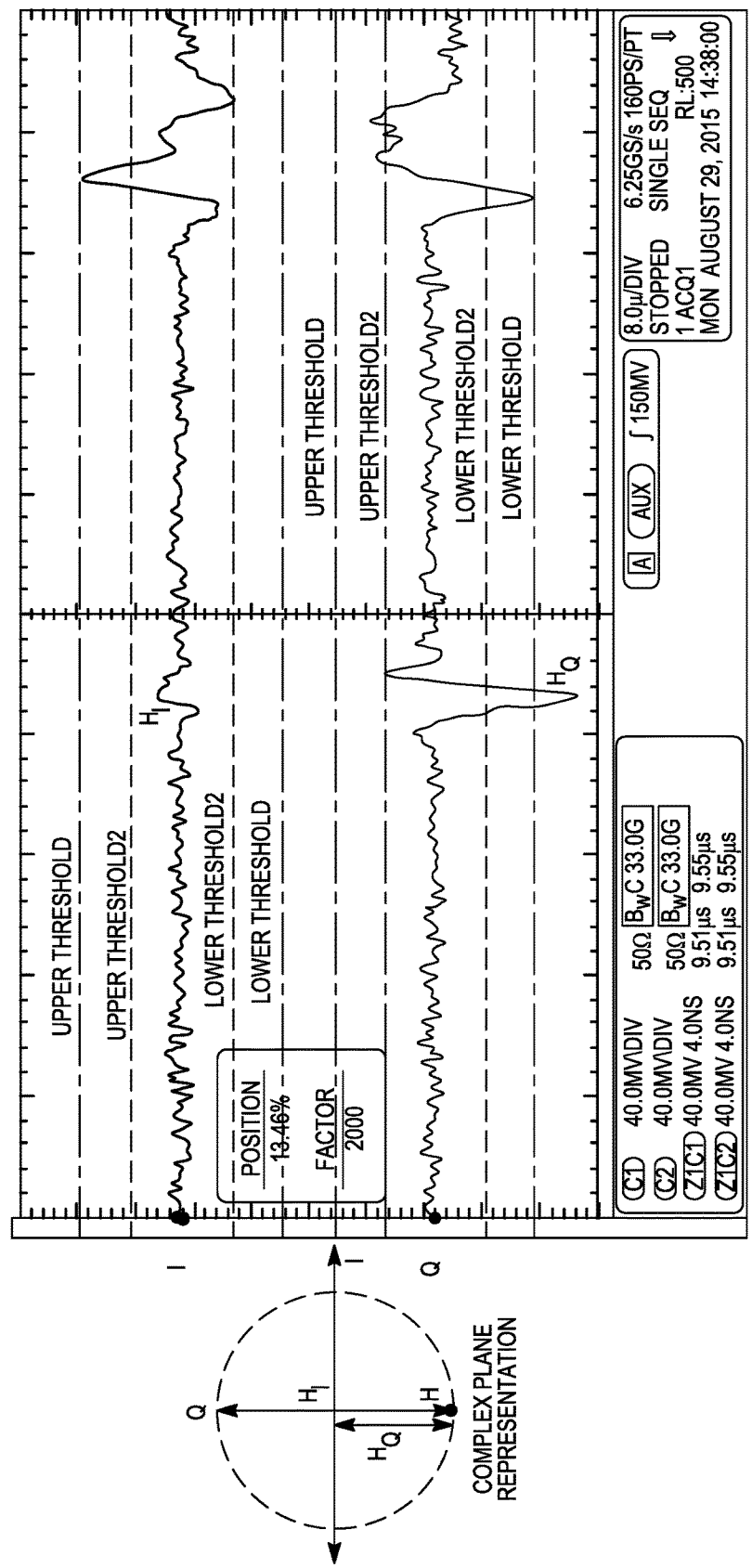
Figure 5H:
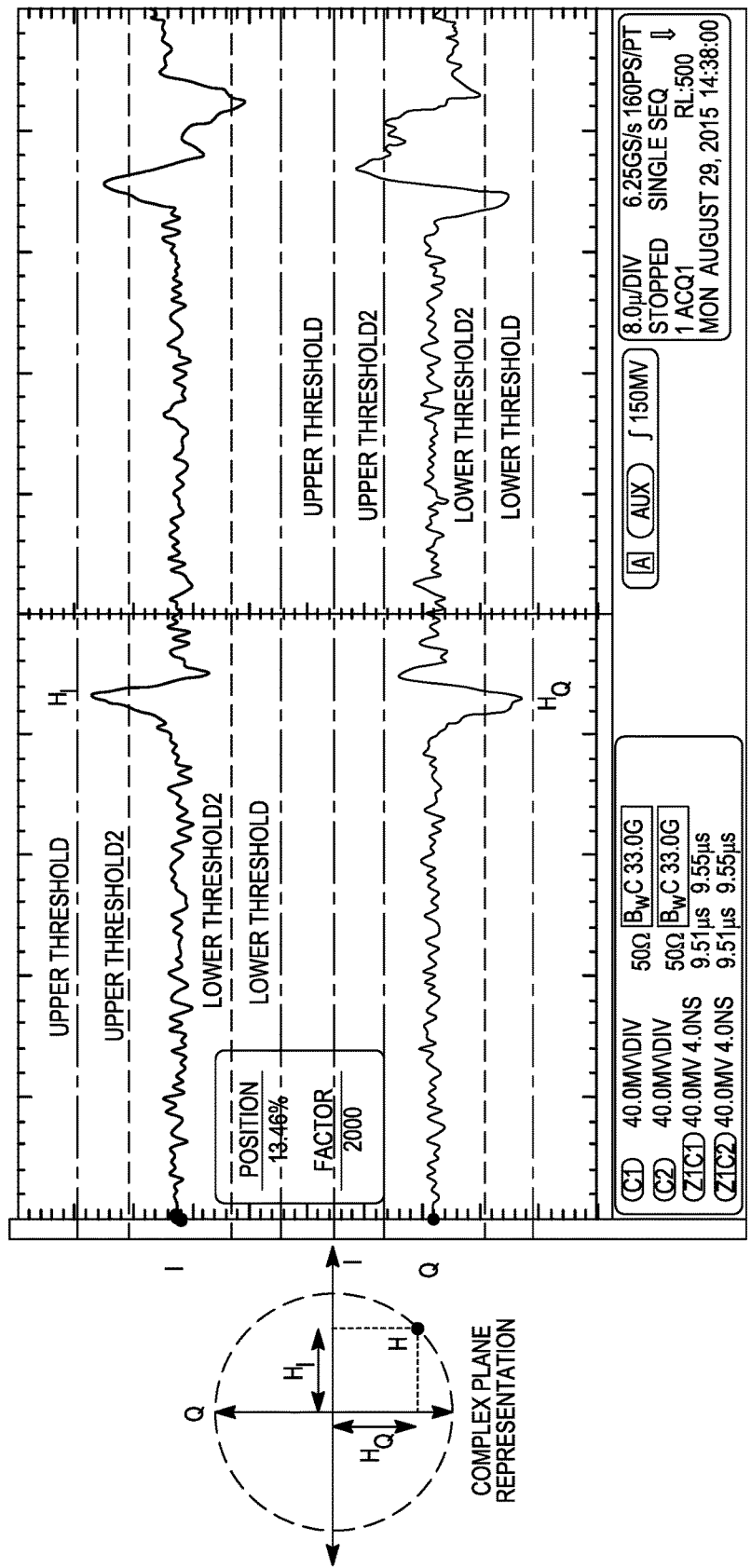

FIGS. 10A-10D show the timing diagram of the top level frame synchronization module shown in FIG. 6 The scenario depicted is that of the header on the I input being present while the header on the Q input being absent as represented in FIG. 5A. Thus, we have the begin_data_storage signal of the I input being set to 1 when valid data appears on the da_in_r_hd_syn to dd_in_f_hd_syn I data lines. Also, the begin_data_storage signal of the Q input is not set to 1 when valid data appears on the da_in_r_hd_syn to dd_in_f_hd_syn Q data lines, as no header was found for the Q input. This also means that the Q input has a digital offset as the header position could not be determined for this particular OFDM frame. Experimental observations for self-coherent OFDM detection show that the complementary waxing and waning of the I and Q headers (as shown in FIGS. 5A-5H) usually occurs tens of times per second. Thus, the Q input will detect a header and hence the new header position to eliminate the digital offset in the order of tens of milliseconds. This time period can be compared to the time it takes for the fiber delay and hence the header position/offset to change, which is usually in the order of tens of seconds. Thus, even though the circuitry (for I or Q input) may fail to detect a header to correct for digital offset for every OFDM frame, the digital offset (if and when present) is corrected about 3 orders of magnitude faster than the time it takes for the temporal offset to change to a new value. The inability of the circuitry to detect a header to correct for digital offset is a direct outcome of using higher thresholds (upper_threshold/lower_threshold) which the header is unable to breach in every OFDM frame. As the OFDM I and Q waveforms suffer from random small amplitude fluctuations, the higher thresholds are required to eliminate the possibility of detecting a false header position.

Lower thresholds (i.e., upper_threshold2/lower_threshold2) are used to detect the start of the OFDM frame and set the begin_data_storage signal to 1. These lower thresholds guarantee that the header for the I or Q input will breach them every OFDM frame. In the scenario shown in FIGS. 10A-10D, the I input header is detected and hence the signal begin_data_storage_delay_reg[1] which is a 3 cycle delayed version of the begin_data_storage signal for the I input, is set to 1 when valid data appears on the fft_ram_data_i_layer3 lines. Because the Q input header is not detected, the signal begin_data_storage_Q_reg which is a 3 cycle delayed version of the begin_data_storage signal for the Q input, stays at 0 level even when valid data appears on the fft_ram_data_input_Q lines. The OR operation on begin_data_storage_delay_reg[1] and begin_data_storage_Q_reg ensures that begin_data_storage_o is set to 1 when valid data appears on the fft_ram_data_i_layer3 and fft_ram_data_input_Q lines. The OFDM processing block will thus begin data processing even when the I input header alone has been detected in this case.

An implementation of the frame synchronization circuitry that may be used for direct detection OFDM can be considered to be a subset of the coherent OFDM implementation discussed above. This is due to the fact that direct detection OFDM consists of just one input and hence can be connected to the I input of the coherent OFDM frame synchronization circuitry. It should be noted that the header for direct detection OFDM does not wax and wane like its coherent counterpart. This is because direct detection does not rely on interference with a local oscillator/carrier at the receiver and hence does not suffer from the effects of random phase variation between the local oscillator/carrier and the received signal. As a consequence, the header on the single input is guaranteed to breach the lower_thresholds (upper_threshold2/lower_threshold2) in every OFDM frame. Thus, in FIG. 6, only the primary FPGA 310 is necessary for frame synchronization in direct detection OFDM. Unused outputs such as thresholds and early_bds can be left unconnected while unused inputs such as begin_data_storage_input, begin_data_storage_Q_reg and the fft_ram_data_input_Q lines must be connected to zero level to ensure predictable circuit operation.

While the techniques described herein have been applied to OFDM signals operating in the optical domain, in some embodiments these techniques may be applicable to OFDM signals operating in the RF domain, especially for applications where there is no significant multipath interference.

Aspects of the subject matter described herein are operational with numerous general purpose or special purpose computing system environments or configurations. Examples of well-known computing systems, environments, or configurations that may be suitable for use with aspects of the subject matter described herein comprise personal computers, server computers, hand-held, mobile or laptop devices, multiprocessor systems, microcontroller-based systems, set-top boxes, programmable consumer electronics, network PCs, minicomputers, mainframe computers, and distributed computing environments that include any of the above systems or devices, and the like.

Aspects of the subject matter described herein may be described in the general context of computer-executable instructions, such as program modules or components, being executed by a computer. Generally, program modules or components include routines, programs, objects, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 11:
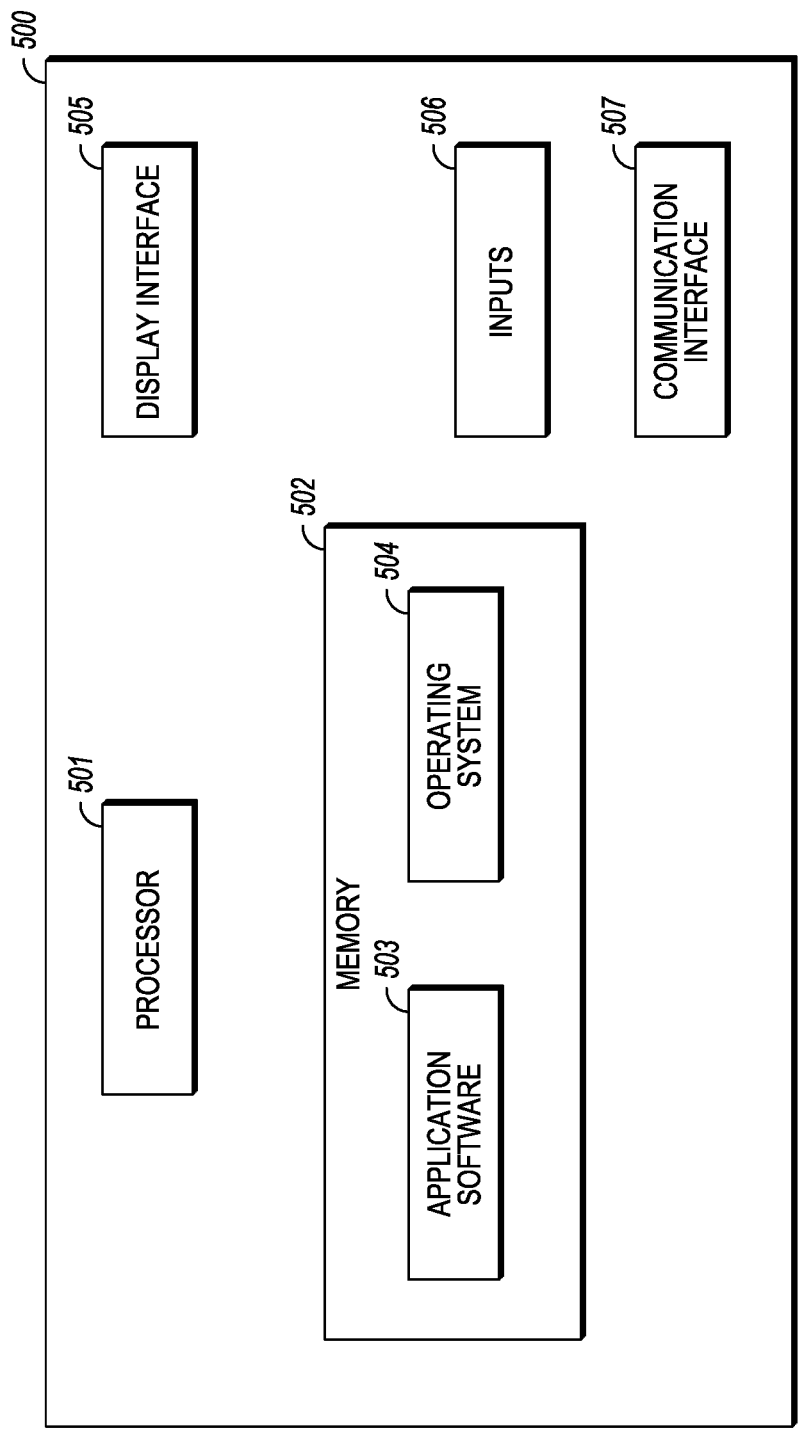
FIG. 11 illustrates various components of an illustrative computing-based device 500.

FIG. 11 illustrates various components of an illustrative computing-based device 500 which may be implemented as any form of a computing and/or electronic device, and in which embodiments of the frame synchronization technique as described above may be implemented.

The computing-based device 500 comprises one or more inputs 506 which are of any suitable type for receiving media content, Internet Protocol (IP) input, activity tags, activity state information, resources or other input. The device also comprises communication interface 507 to enable the device to communicate with one or more other entity using any suitable communications medium.

Computing-based device 500 also comprises one or more processors 501 which may be microprocessors, controllers or any other suitable type of processors for processing computing executable instructions to control the operation of the device in order to provide a search augmentation system. Platform software comprising an operating system 504 or any other suitable platform software may be provided at the computing-based device to enable application software 503 to be executed on the device.

The computer executable instructions may be provided using any computer-readable media, such as memory 502. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 505 is provided to control a display device to be used in conjunction with the computing device. The display system may provide a graphical user interface, or other user interface of any suitable type.

As disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable storage medium and executed by one or more processors.

Although the subject matter has been described in language specific to structural features and/or methodological acts, it is to be understood that the subject matter defined in the appended claims is not necessarily limited to the specific features or acts described above. Rather, the specific features and acts described are disclosed as example forms of implementing the claims.

The invention claimed is:

1. A receiver, comprising:
a detector configured to receive an optical OFDM bit stream that includes a plurality of frames each having an in-phase component and a quadrature phase component, each component having an OFDM symbol-bearing data payload and a synchronization header preceding the data payload, the synchronization header including a single synchronization pulse; and
a frame synchronizer for detecting the synchronization header on the in-phase and the quadrature phase components, the frame synchronizer including first and second pairs of digital comparators for each of the in-phase and quadrature phase components, the first and second pairs of digital comparators associated with the in-phase component establishing different and adjustable threshold windows symmetric about a zero amplitude of the synchronization pulse of the in-phase component, the first and second pairs of digital comparators associated with the quadrature phase component establishing different and adjustable threshold windows symmetric about a zero amplitude of the synchronization pulse of the quadrature phase component, each of the frames being synchronized when the synchronization pulse respectively associated therewith is detected as having an amplitude that extends beyond at least one of the windows established for the in-phase component or the quadrature phase component.

2. The receiver of claim 1, wherein the optical detector includes an A/D converter for receiving an OFDM data signal and converting the OFDM data stream into the OFDM bit stream.

3. The receiver of claim 2, wherein the OFDM data signal is an optical OFDM data signal and the detector includes a coherent receiver preceding the A/D converter.

4. The receiver of claim 1, wherein the windows established by the first and second pairs of digital comparators associated with the quadrature phase component are each equal in width to one of the windows established by the first and second pairs of digital comparators associated with the in-phase component.

5. The receiver of claim 1, further comprising an OFDM demodulator/decoder and the frame synchronizer is further configured to cause the OFDM demodulator/decoder to begin OFDM demodulation and decoding when a synchronization pulse is detected with a magnitude that exceeds a smaller of the windows that are symmetric about the zero amplitude of the synchronization pulse of the in-phase component or the quadrature phase component.

6. The receiver of claim 5, wherein the frame synchronizer includes a latch for transferring each of the frames to the OFDM demodulator/decoder based on a time when the synchronization pulse respectively associated with each frame is detected with a magnitude that exceeds a larger of the windows that are symmetric about the zero amplitude of the synchronization pulse of the in-phase component or the quadrature phase component.

7. The receiver of claim 6, wherein the latch transfers each of the frames to the OFDM demodulator/decoder at a time that eliminates a temporal offset that begins when a frame is received and ends when the frame is expected.

8. The receiver of claim 1, wherein the OFDM data signal is an optical OFDM data signal and the detector is configured to operate in accordance with an intensity modulation and direct detection scheme, the frames being synchronized when the synchronization pulse respectively associated therewith is detected as having an amplitude that extends beyond at least one of the windows established for the in-phase component.

9. A method of determining a start time of frames in an OFDM bit stream, comprising:
receiving an OFDM bit stream that includes a plurality of frames each having an in-phase component and a quadrature phase component, each component having an OFDM symbol-bearing data payload and a synchronization header preceding the data payload, the synchronization header including a single synchronization pulse; and
detecting the synchronization header on the in-phase and the quadrature phase components to synchronize the frames, wherein detecting the synchronization header includes determining when the synchronization pulse respectively associated with each frame has an amplitude that extends beyond a first pair of windows that are established for the in-phase component and a second pair of windows that are established for the quadrature phase component, the first pair of windows being different in size from one another and symmetric about a zero amplitude of the synchronization pulse of the in-phase component and the second pair of windows being different in size from one another and symmetric about a zero amplitude of the synchronization pulse of the quadrature-phase component.

10. The method of claim 9, wherein receiving the OFDM bit stream further comprises:
receiving an optical OFDM signal;
detecting the optical OFDM signal with an optical detector to generate an RF OFDM signal;
transforming the RF OFDM signal into the OFDM bit stream.

11. The method of claim 10, wherein optical detector includes a coherent receiver.

12. The method of claim 9, further comprising beginning OFDM demodulation and decoding when a synchronization pulse is detected with a magnitude that exceeds a smaller of the windows that are symmetric about the zero amplitude of the synchronization pulse of the in-phase component or the quadrature phase component.

13. The method of claim 12, further comprising transferring each of the frames to an OFDM demodulator/decoder based on a time when the synchronization pulse respectively associated with each frame is detected with a magnitude that exceeds a larger of the windows that are symmetric about the zero amplitude of the synchronization pulse of the in-phase component or the quadrature phase component.

14. The method of claim 13, wherein transferring each of the frames to the OFDM demodulator/decoder includes transferring each of the frames to the OFDM demodulator/decoder at a time that eliminates a temporal offset that begins when a frame is received and ends when the frame is expected.

15. A method of determining a start time of frames in an OFDM bit stream, comprising:
receiving an OFDM bit stream that includes a plurality of frames, each frame having an OFDM symbol-bearing data payload and a synchronization header preceding the data payload, the synchronization header including a single synchronization pulse; and detecting the synchronization header on the bit stream to synchronize the frames, wherein detecting the synchronization header includes determining when the synchronization pulse respectively associated with each frame has an amplitude that extends beyond a pair of windows that are established for the bit stream, the pair of windows being different in size from one another and symmetric about a zero amplitude of the synchronization pulse of the bit stream.

\* \* \* \* \*